(12) United States Patent
Richter et al.

(10) Patent No.: US 11,022,470 B2
(45) Date of Patent: Jun. 1, 2021

(54) FREE-JET DOSING SYSTEM

(71) Applicant: Fraunhofer-Gesellschaft zur Foerderung der angewandten Forschung e.V., Munich (DE)

(72) Inventors: Martin Richter, Munich (DE); Martin Wackerle, Assling (DE); Sebastian Kibler, Munich (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 540 days.

(21) Appl. No.: 15/372,683

(22) Filed: Dec. 8, 2016

(65) Prior Publication Data

US 2017/0160113 A1 Jun. 8, 2017

(30) Foreign Application Priority Data

Dec. 8, 2015 (DE) .......................... 102015224622.1

(51) Int. Cl.
*G01F 1/42* (2006.01)
*F04B 23/02* (2006.01)
(Continued)

(52) U.S. Cl.
CPC ................ *G01F 1/42* (2013.01); *B05B 1/02* (2013.01); *F04B 13/00* (2013.01); *F04B 23/028* (2013.01);
(Continued)

(58) Field of Classification Search
CPC ....... B05B 1/02; B05B 17/0607; F04B 13/00; F04B 43/046; F04B 51/00; F04B 43/043;
(Continued)

(56) References Cited

U.S. PATENT DOCUMENTS 6,116,863 A * 9/2000 Ahn ...................... F04B 43/043
417/322
6,253,605 B1 * 7/2001 Richter ................... G01F 1/363
73/203
(Continued)

FOREIGN PATENT DOCUMENTS

DE 4433894 A1 3/1996
DE 10238600 A1 3/2004
(Continued)

OTHER PUBLICATIONS

Richter, M. et al., "A Novel Flow Sensor With High Time Resolution Based on Differential Pressure Principle", Proceedings MEMS '99, 12th IEE International Workshop Micro Electromechanical System, Orlando/USA, Jan. 17-21, 1999, pp. 118-123.

*Primary Examiner* — Vishal Pancholi
*Assistant Examiner* — Robert K Nichols, III
(74) *Attorney, Agent, or Firm* — Michael A. Glenn; Perkins Coie LLP

(57) ABSTRACT

The invention relates to a free-jet dosing system for dosing a free fluid jet to be dispensed. The free-jet dosing system includes, inter alia, a pump including an inlet and an outlet and configured to deliver fluid to be dispensed to the outlet. The free-jet dosing system further includes a dosage monitoring device arranged on the outlet side of the pump, the dosage monitoring device having an opening through which at least some of the fluid to be dispensed may pass, and the dosage monitoring device having a flow rate meter configured to determine the flow rate of the fluid which passes through the opening of the dosage monitoring device. In the inventive free-jet dosing system, the opening of the dosage monitoring device is configured as an outlet nozzle for ejecting the free fluid jet.

21 Claims, 7 Drawing Sheets

(51) Int. Cl.
*F04B 13/00* (2006.01)
*F04B 53/10* (2006.01)
*G01F 11/08* (2006.01)
*B05B 1/02* (2006.01)
*F04B 43/04* (2006.01)
*F04B 51/00* (2006.01)

(52) U.S. Cl.
CPC ............ *F04B 43/046* (2013.01); *F04B 51/00* (2013.01); *F04B 53/10* (2013.01); *F04B 53/1037* (2013.01); *G01F 11/08* (2013.01); *F04B 2205/09* (2013.01)

(58) Field of Classification Search
CPC . F04B 45/04; G01F 1/42; G01F 1/363; G01F 1/383; G01F 15/028
USPC ............................................................ 222/71
See application file for complete search history.

(56) References Cited

U.S. PATENT DOCUMENTS

| | | | |
|---|---|---|---|
| 6,875,402 B2* | 4/2005 | Hirota | B01J 19/0046 239/102.2 |
| 7,104,768 B2 | 9/2006 | Richter et al. | |
| 2003/0143122 A1* | 7/2003 | Sander | B01L 3/0268 422/503 |
| 2005/0174395 A1* | 8/2005 | Mita | B41J 2/04541 347/72 |
| 2011/0142688 A1* | 6/2011 | Chappel | A61M 5/16854 417/213 |

FOREIGN PATENT DOCUMENTS

| | | |
|---|---|---|
| DE | 102008035990 A1 | 2/2010 |
| EP | 0703364 A1 | 3/1996 |
| EP | 1320686 B1 | 2/2004 |
| EP | 1576294 B1 | 8/2006 |
| EP | 2220371 B1 | 6/2012 |
| WO | 9848330 A1 | 10/1998 |
| WO | 03095837 A1 | 11/2003 |

* cited by examiner

FREE-JET DOSING SYSTEM

CROSS-REFERENCE TO RELATED APPLICATIONS

This application claims priority from German Patent Application No. 10 2015 224 622.1, which was filed on Dec. 8, 2015, and which is incorporated herein in its entirety by this reference thereto.

The invention relates to a free-jet dosing system having the features of claim 1.

Free-jet (open-jet) dosing systems have been applied in numerous fields of technology, for example in medical technology, laboratory technology, diagnostics or production technology.

BACKGROUND OF THE INVENTION

In terms of the physical mechanisms for free-jet dispensers one differentiates between the pressure pulse principle and the jet principle. In accordance with the pressure pulse principle, a very short pressure pulse is produced within a liquid chamber, for example by means of a bubble produced by heating, a so-called bubble jet, or by a piezo. With the pressure pulse principle, no volume is displaced. The pressure pulse propagates toward the nozzle, where a drop of a typical size of 0.05 nanoliters is released.

In accordance with the jet principle, a volume typically ranging around 50 nanoliters is displaced, e.g., by a piezo membrane actuator. The volume is ejected as a long jet, also referred to as a free jet, through a nozzle.

In both systems, disturbance variables in the form of gas bubbles occur frequently. The pressure pulse principle is very sensitive to gas bubbles occurring within the liquid chamber since due to them, the pressure pulse is heavily dampened, and no drop will be released.

With the jet principle, too, a gas bubble will reduce the pressure amplitude as a function of the compression ratio between the stroke volume and chamber volume, so that the free jet will be disturbed. This is added to by the fact that in many jet dispensers, the capillary force of a meniscus formed on the nozzle is useful so as to prevent the liquid from flowing back when the chamber is being refilled. If there is a gas bubble on the nozzle, no meniscus will be present, and refilling will be disturbed. This results in failure of the jet dispenser.

An improvement of the jet dispenser is represented by the free-jet dispenser known from WO 03/095837 A1, which combines a self-filling micropump with a nozzle chip. In this case, too, the dosing accuracy of the jet depends on the presence of gas bubbles. Moreover, this free-jet dispenser is not suitable for dosing a liquid to be dispensed when a gas bubble is pushed out of the nozzle.

In many applications, therefore, monitoring of the free jet, or of the amount of liquid dispensed in the form of the free jet, may be used.

In order to monitor successful administration of a free jet, several methods are known today. Firstly, optical monitoring of the amount of liquid dispensed in the form of a free jet is known. Secondly, capacitive monitoring of the amount of liquid dispensed in the form of a free jet is known. However, said monitoring methods partly can be realized only with a large amount of expenditure and involve additional components such as optical or capacitive sensor elements, for example. Typically, this results in that such monitoring devices are expensive and time-consuming to produce.

For dosing (metering) a fluid flow, a dosing device element is known from WO 98/48330 A1, for example. The dosing device element has a membrane comprising an opening which represents a forward resistance for a medium which is to be dosed and flows through said opening. The membrane for dosing a fluid flow is a thin semiconductor membrane. Therefore, the membrane is unsuitable for dosing a free jet ejected with high pressure rather than a fluid flow.

It is therefore the object of the present invention to improve free-jet dosing systems to the effect that the amount of fluid dispensed can be accurately monitored and that the free-jet dosing system is nevertheless not susceptible to disturbance variables while being manufacturable in a simple manner and at low cost.

SUMMARY

According to an embodiment, a free-jet dosing system for dosing a free fluid jet to be dispensed may have: a pump including an inlet and an outlet and configured to deliver fluid to be dispensed to the outlet, a dosage monitoring device arranged on the outlet side of the pump, the dosage monitoring device having an opening through which at least some of the fluid to be dispensed may pass, and the dosage monitoring device including a flow rate meter configured to determine the flow rate of the fluid which passes through the opening of the dosage monitoring device, the opening of the dosage monitoring device being configured as an outlet nozzle for ejecting the free fluid jet, and the outlet nozzle having a laterally surrounding collar.

The inventive free-jet dosing system for dosing a free fluid jet to be dispensed comprises, inter alia, a pump comprising an inlet and an outlet and configured to deliver fluid to be dispensed to the outlet. The free-jet dosing system further comprises a dosage monitoring device arranged on the outlet side of the pump, the dosage monitoring device having an opening through which at least some of the fluid to be dispensed may pass, and the dosage monitoring device having a flow rate measuring means configured to determine the flow rate of the fluid which passes through the opening of the dosage monitoring device. The opening of the dosage monitoring device is configured, according to the invention, as an outlet nozzle for ejecting and shaping the free fluid jet. The dosage monitoring device may determine the amount of fluid dispensed in that the flow rate measuring means measures the amount of fluid passing through the opening formed in the dosage monitoring device. Due to the fact that the dosage monitoring device is mounted on the outlet side of the pump, the fluid to be dispensed may be ejected through the opening formed in the dosage monitoring device. The opening is configured such that it has a jet-shaping action and ejects the fluid to be dispensed in the form of a free jet. In this context, the pump generates high pressures of up to 40 bar. The opening formed in the dosage monitoring device thus forms a high-pressure resistant nozzle for ejecting a free jet having a defined shape, said nozzle simultaneously serving as a forward resistance to measuring the amount of fluid ejected. This is based on the idea that the potential energy of the pressure is converted to the kinetic energy of the free jet at the nozzle and that the entire pressure drops at the nozzle. Thus, the dosed amount may be inferred from measuring the pressure. Since the opening of the dosage monitoring device is configured as a nozzle, a separate nozzle chip may be dispensed with. In addition, on that side of the dosage monitoring device which faces the outlet of the pump, the fluid flows through the dosage monitoring device at a constant pressure. This means that the dosage monitoring device is not directly subjected to a free jet, but the free jet is produced at the outlet of the nozzle only.

According to an embodiment, the dosage monitoring device is arranged to be in contact, at least in sections, with outlet of the pump. At least in sections, there is thus a direct connection between the pump outlet and the dosage monitoring device. The distances between the pump outlet and the dosage monitoring device which are to be covered by the fluid to be dispensed may thus be advantageously kept short. Therefore, the pump pressure may be transmitted to the dosage monitoring device in a largely loss-free manner.

It is feasible for the pump to be a micropump. For example, the entire free-jet dosing system may have small and compact dimensions.

The micropump may comprise a pump chamber arranged between the inlet and the outlet, a membrane arranged, at least in sections, in the area of the pump chamber, and a membrane deflection means, the membrane deflection means being configured to deflect the membrane such that the volume of the pump chamber is enlarged so as to suck in the fluid to be dispensed, and that the volume of the pump chamber is reduced so as to dispense the fluid to be dispensed. Such membrane-controlled micropumps are suitable for producing pressure pulses, in particular in an intermitting manner. The pump here does not generate any continuous pressure but a pressure pulse, or a sequence of pressure pulses. Thus, the dosage monitoring device has a transient, time-variable pressure signal applied to it. Detection of the opening being blocked may be enabled by analyzing said transient signal. In the event of a static flow, the dosage monitoring device cannot distinguish whether or not the opening is blocked. However, the transient, time-dependent signal applied at the dosage monitoring device differs in terms of whether or not the opening is blocked. If the opening is not blocked, the pressure pulse generated by the pump will decrease within a few milliseconds. If the opening is blocked, an overpressure will build up which cannot flow off, however. This may be detected, for example, by means of a signal analysis of the dosage monitoring device.

It is feasible for the membrane deflection means to be a piezoelement configured to deflect the membrane as a function of the voltage applied to the piezoelement. Low voltages may suffice for operating the pump. In addition, high clock rates of the pump, e.g., 500 Hz, may be realized with the piezoelement.

It is conceivable for the pump to comprise a check valve on the outlet side, which check valve closes the outlet when the pump sucks in the fluid to be dispensed, and opens the outlet when the pump dispenses the fluid to be dispensed from the outlet. Said valves prevent unintentional backflow of the fluid to be dispensed. Said valves allow the fluid to be dispensed to exit through the outlet valve during the pressure stroke of the pump. However, during the suction stroke of the pump, closing of the outlet is desired so as to be able to pump new fluid to be dispensed through the inlet into the pump chamber. This is why said valves close the outlet during the suction stroke of the pump and thus prevent undesired backflow of the fluid to be dispensed through the outlet.

It is also feasible for the free-jet dosing system to comprise a nozzle chamber arranged between the pump outlet and the outlet nozzle, and for the check valve to be arranged between the pump outlet and the nozzle chamber. The pressure which may be used for ejecting the free jet may thus already be built up upstream from the nozzle chamber, i.e., within the pump chamber arranged upstream from the nozzle chamber, since the check valve separates the nozzle chamber from the pump chamber.

It is conceivable for the free-jet dosing system to comprise control means configured to control the flow rate measuring means and the pump such that the flow rate measuring means detects a flow of fluid from the nozzle chamber to the pump chamber when the pump sucks in the fluid to be dispensed. During the suction stroke of the pump, the check valve arranged on the outlet side is closed in a fluid-tight (leak-proof) manner. Should the outlet valve leak, the fluid contained within the nozzle chamber will flow past the defect check valve and back into the pump chamber. Since the flow rate measuring means may detect a fluid flow from the nozzle chamber to the pump chamber during the suction stroke, leakage currents and/or leaks in the check valve arranged on the outlet side can thus be detected.

In accordance with an embodiment, the control means may be configured to compare an amount of a free fluid jet dispensed, said amount having been determined by means of the flow rate measuring means, to an amount comparison value, and to generate a signal if the amount dispensed is smaller than the amount comparison value. The control means thus monitors the amount of fluid actually dispensed during a pump stroke. The quantity comparison value may correspond, e.g., to a desired dispensing quantity, e.g., 10 nl. If the flow rate measuring means measures less than 10 nl during a pump stroke, the control means may output a signal signaling the insufficient dispensing quantity. This signal may be evaluated, for example, by the control means; if need be, the control means triggers a further pump stroke so as to achieve or possibly exceed the dosing volume comparison value. Too small a value of the quantity dispensed may further indicate that the inlet valve is leaking, for example. Some of the stroke volume is delivered back into the inlet conduit during the pressure stoke (in the event of a defect inlet valve) rather than being pumped into the nozzle chamber. The reduced dispensing quantity is measured by the dosage monitoring device by means of the rate of flow measuring means. It is also feasible that the flow rate which falls below the quantity comparison value may be an indication that the stroke volume of the pump membrane is decreasing.

The control means may be configured to determine a time-variable instantaneous value of a fluid pressure applied at the opening of the dosage monitoring device arranged on the outlet side. During ejection of the stroke volume of the pump through the outlet valve, a defined, time-dependent overpressure is generated. This overpressure opens the outlet valve. The flow rate measuring means here measures a very rapidly increasing pressure signal at the nozzle. When the free fluid jet of the typically incompressible liquid is ejected, the pressure applied within the pump chamber and at the nozzle will decrease over time. More specifically, the control means measures the pressure difference between that side of the nozzle which faces the pump outlet and the outlet side of the nozzle, which faces away from the pump outlet. The pressure difference changes over time. For example, at the beginning of a pump stroke, there will be a high initial pressure on that side of the nozzle which faces the pump outlet, said pressure being higher than the pressure (e.g., ambient pressure) present on that side of the nozzle which faces away from the pump outlet. The rising edge of the pressure profile on that side of the nozzle which faces the pump outlet thus rises steeply at the beginning of the pump stroke. The closer the pump stroke comes to its end, the more fluid has already flowed through the nozzle. Accordingly, the overpressure which exists on that side of the nozzle which faces the pump outlet continues to decrease as compared to the overpressure which exists on that side of the nozzle which faces away from the pump outlet. The pressure profile and/or the pressure signal thus exhibits an edge which falls as time evolves. The flow rate measuring means may determine instantaneous values of this continuously time-variable transient pressure and may possibly integrate it over time.

The control means may be configured to determine the time-dependent flow of fluid through the opening by means of the time-variable fluid pressure applied at the opening and by means of the static characteristic of the opening, and to integrate the fluid flow thus determined over time so as to determine the volume of the free fluid jet to be dosed. The dosage monitoring device is configured to determine the amount of fluid flowing through the outlet nozzle by means of the transient, i.e., time-dependent, pressure signal by using the flow rate measuring means. The dosage monitoring device is configured such that the time-dependent flow of fluid through the opening, or nozzle, may be determined from the measured time-dependent pressure signal and the static characteristic of the opening used as the nozzle. Said flow of fluid may also be integrated over time so as to determine the dosed volume, or flow rate. By means of the pressure, the dosage monitoring device may thus measure, or determine, the flow rate of the fluid to be dispensed which flows through the opening, or nozzle, by using the flow rate measuring means.

According to a further embodiment, the control means may be configured to determine, when a free fluid jet is dispensed, a value of the amplitude of the fluid pressure applied at the opening of the dosage monitoring device and to compare same to an amplitude comparison value and/or to measure the period of time taken for pressure equalization at the opening and to compare same to a time comparison value so as to detect a gas bubble within the pump chamber of the pump if the determined amplitude value is smaller than the amplitude comparison value and/or if the measured time period for pressure equalization is larger than the time comparison value. A gas bubble within the pump chamber results in that the pressure amplitude becomes smaller and that equalization of pressure takes longer. Both may be measured by the dosage monitoring device.

According to a further embodiment, the free-jet dosing system may comprise a nozzle chamber arranged between the pump outlet and the outlet nozzle, and the control means being configured to determine, when a free fluid jet is dispensed, a value of the amplitude of the fluid pressure applied at the opening of the dosage monitoring device and to compare same to an amplitude comparison value and/or to measure the period of time taken for a pressure increase at the opening and to compare same to a time comparison value so as to thus detect a gas bubble within the nozzle chamber if the determined amplitude value is smaller than the amplitude comparison value and/or if the measured time period for the pressure increase is larger than the time comparison value. A gas bubble within the nozzle chamber results in that said gas bubble will be compressed, as a function of its size, by the pressure pulse, whereby the pressure amplitude decreases and the rising edges will be delayed.

According to one embodiment, the pump may be configured to be an intermittently operating pump. The pump here generates a pressure pulse, or a sequence of pressure pulses. Thus, the dosage monitoring device, or the nozzle, has a transient, time-variable pressure signal applied to it. Detection of the opening, or the nozzle, being blocked may be enabled by analyzing said transient signal. In the event of a static flow, the flow rate measuring means cannot tell whether or not the nozzle is blocked. However, the transient, time-dependent signal applied at the nozzle differs in terms of whether or not the nozzle is blocked. If the nozzle is not blocked, the pressure pulse generated by the pump will decrease within a few milliseconds. If the nozzle is blocked, an overpressure will build up which cannot flow off, however. This may be detected by means of a signal analysis.

Further embodiments of the invention will be described in the following, the further embodiments being combinable with any of the embodiments claimed in the claims.

1. Free-jet dosing system for dosing a free fluid jet to be dispensed, comprising:
   a pump comprising an inlet and an outlet and configured to deliver fluid to be dispensed to the outlet,
   a dosage monitoring device arranged on the outlet side of the pump, the dosage monitoring device comprising an opening through which at least some of the fluid to be dispensed may pass, and the dosage monitoring device comprising a flow rate measuring means configured to determine the flow rate of the fluid which passes through the opening of the dosage monitoring device,
   the opening of the dosage monitoring device being configured as an outlet nozzle for ejecting the free fluid jet,
   the free-jet dosing system further comprising means for calibrating and/or detecting faults in the free-jet dosing system.
2. Free-jet dosing system of embodiment 1, the free-jet dosing system further comprising a flow sensor arranged on the inlet and comprising an opening and a flow rate measuring means, the flow rate measuring means being configured to determine the flow rate of the fluid passing through this opening.
3. Free-jet dosing system of embodiment 1, wherein the means for calibrating and/or detecting faults in the free-jet dosing system comprises control means configured to detect an actual sensor signal of the flow sensor and/or dosage monitoring device when the pump is inactive, and to correct, on the basis thereof, subsequent sensor signals of the flow sensor and/or of the dosage monitoring device.
4. Free-jet dosing system of any of the preceding embodiments, wherein the control means is configured to determine a correction value and to subtract same from the amount of the detected actual sensor signal of the flow sensor and/or dosage monitoring device, the obtained difference value forming a corrected starting point for the subsequent sensor signals of the flow sensor and/or dosage monitoring device.
5. Free-jet dosing system of any of embodiments 3 or 4, wherein the control means is configured to determine a correction value whose amount corresponds to the amount of the detected actual sensor signal of the flow sensor and/or dosage monitoring device.
6. Free-jet dosing system of any of embodiments 3 or 4, wherein the control means is configured to determine a correction value whose amount is within a range of the amount of the detected actual sensor signal plus a tolerance value in the amount of ±10% of the measured sensor signal or plus a tolerance value in the amount of ±20% of the measured sensor signal.
7. Free-jet dosing system of any of the preceding embodiments, wherein the control means is configured to perform detection of the actual sensor signal of the flow sensor and/or dosage monitoring device and correction of subsequent sensor signals of the flow sensor and/or dosage monitoring device prior to any pump stroke or prior to each pump stroke.
8. Free-jet dosing system of any of the preceding embodiments, the free-jet dosing system having, on the inlet side, the same pressure as on the outlet side or a lower pressure than on the outlet side.
9. Free-jet dosing system of any of the preceding embodiments, the free-jet dosing system comprising a valve arranged on the inlet side and/or the outlet side, said valve being an active normally closed valve and/or an active normally open valve and/or a valve with an operation threshold pressure which is closed below a threshold pressure, and/or a double normally closed microvalve and/or a safety valve.
10. Free-jet dosing system of any of the preceding embodiments, wherein the means for calibrating and/or detecting a fault in the free-jet dosing system include a control means configured to control the pump as well as the dosage monitoring device and the flow sensor, which is arranged on the inlet side, such that both the dosage monitoring device and the flow sensor determine the flow rate of the fluid flowing through the respective opening of the dosage monitoring device and of the flow sensor when the pump sucks in the fluid to be dispensed, and wherein the control means is further configured to compare the flow rate determined by the dosage monitoring device and the flow rate determined by the flow sensor.
11. Free-jet dosing system of any of embodiments 9 or 10, wherein the means for calibrating and/or detecting a fault in the free-jet dosing system include a control means configured to control the pump as well as the dosage monitoring device and the flow sensor, which is arranged on the inlet side, such that the dosage monitoring device and the flow sensor determine the flow rate of the fluid flowing through the respective opening of the dosage monitoring device and of the flow sensor when the pump dispenses the fluid to be dispensed from the outlet, and wherein the control means further is configured to compare the flow rate determined by the dosage monitoring device and the flow rate determined by the flow sensor.
12. Free-jet dosing system of any of the preceding embodiments, wherein the pump comprises a pump chamber arranged between the inlet and the outlet, a membrane arranged, at least in sections, in the region of the pump chamber, and a membrane deflection means, said membrane deflection means being configured to deflect the membrane such that the volume of the pump chamber is increased for sucking in the fluid to be dispensed, and that the volume of the pump chamber is reduced for dispensing the fluid to be dispensed.
13. Free-jet dosing system of embodiment 12, wherein the membrane deflection means is a piezoelement configured to deflect the membrane in dependence on the voltage applied to the piezoelement.
14. Free-jet dosing system of any of the preceding embodiments, the free-jet dosing system comprising control means configured to compare the flow rate determined by means of the dosage monitoring device to a predefined flow rate comparison value and to control the pump for such time until the flow rate determined by means of the dosage monitoring device is equal to or larger than the predefined flow rate comparison value.
15. Free-jet dosing system of any of the preceding embodiments, wherein a fluid connection means having a low fluidic capacitance is arranged between the pump and the dosage monitoring device, or between the pump and the flow sensor, in particular fluid connection means whose volume remains constant as the operating pressure of the pump varies, and/or fluid connection means having a low fluidic inductance.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
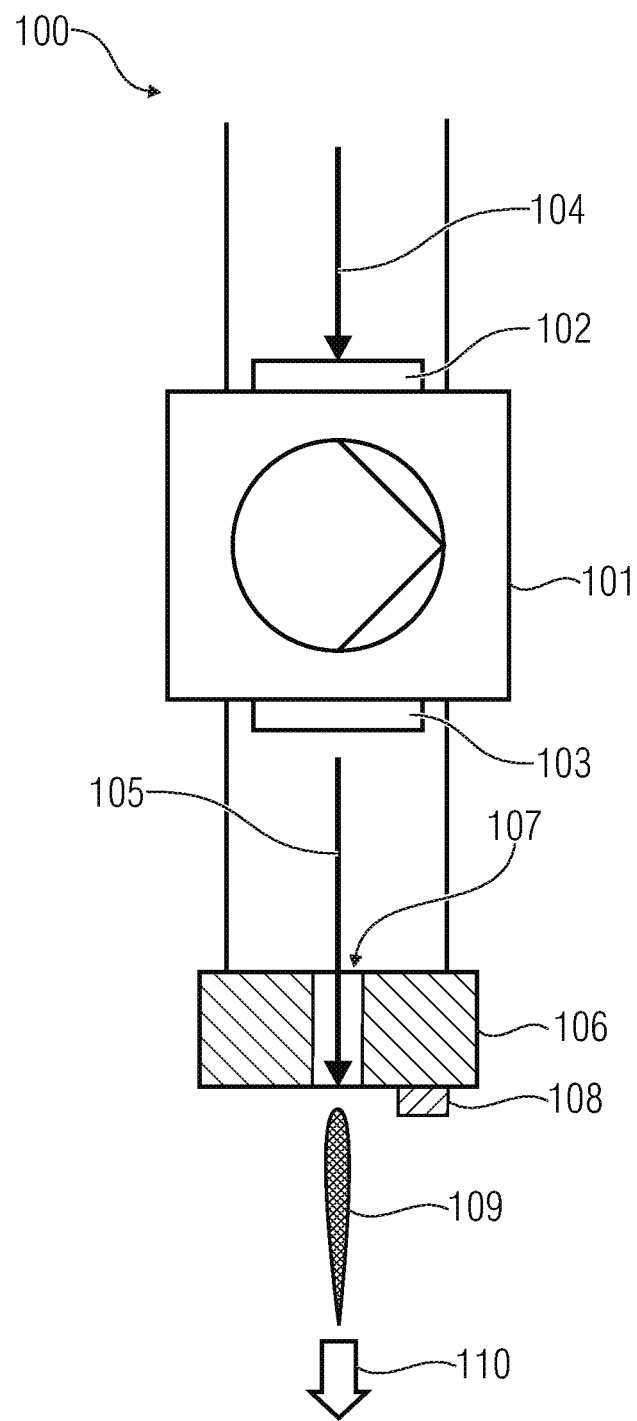
FIG. 1A shows an inventive free-jet dosing system.

FIG. 1A shows an inventive free-jet dosing system 100 for dosing (metering) a free fluid jet to be dispensed. The fluid to be dispensed may be a gas or a liquid, for example. The fluid may have different rheological properties. For example, the fluid may have a low viscosity. The fluid may have components which have medicinal actions. The free fluid jet may be shaped by the outlet nozzle such that it may be injected subcutaneously.

Figure 1B:
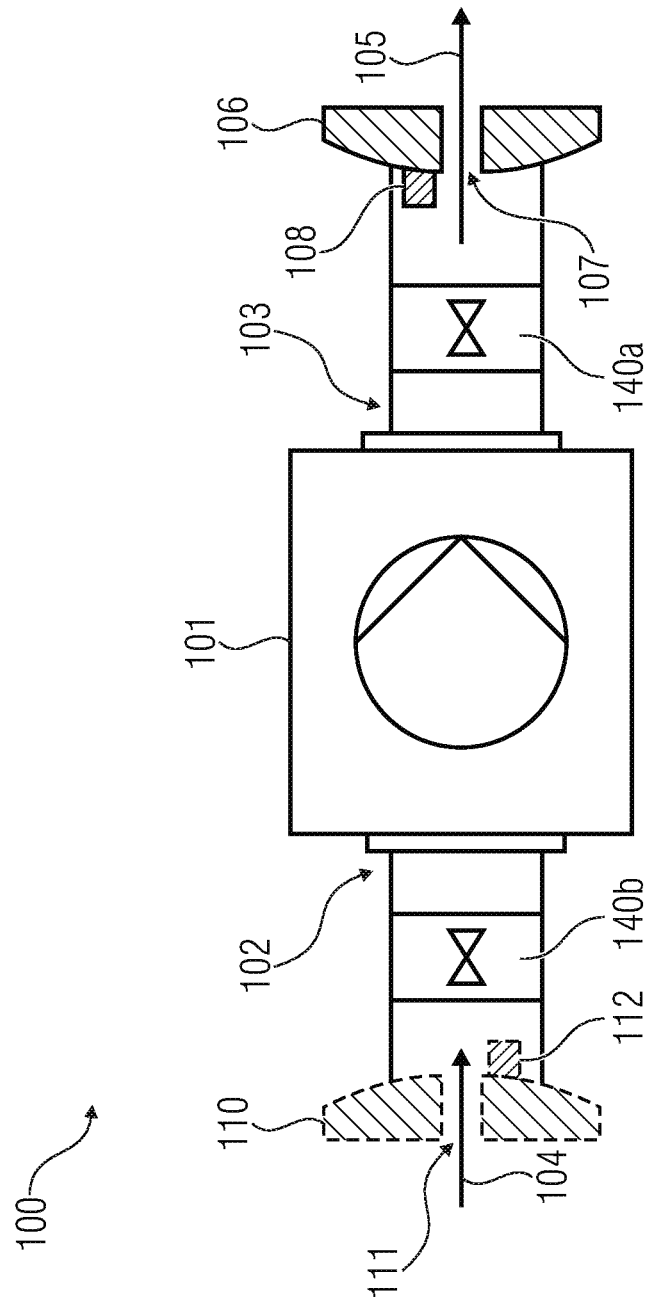
FIG. 1B shows a further embodiment of an inventive free-jet dosing system.

The free-jet dosing system 100 shown in FIG. 1A or 1B comprises, inter alia, a pump 101. The pump 101 comprises an inlet 102 and an outlet 103. The pump 101 is configured to suck in fluid to be dispensed 104, 105 through the inlet 102 and to pump it to the outlet 103.

The free-jet dosing system 100 further comprises a dosage monitoring device 106. The dosage monitoring device 106 is arranged on the outlet side of the pump 101, i.e., it is located on the side of the outlet 103 of the pump 101. The dosage monitoring device 106 comprises an opening 107 through which at least some of the fluid to be dispensed 105 may pass.

The dosage monitoring device 106 moreover comprises a flow rate measuring means 108. The flow rate measuring means 108 is configured to determine the flow rate of the fluid 105 passing through the opening 107 of the dosage monitoring device 106.

The opening 107 of the dosage monitoring device 106 is configured as an outlet nozzle 107 for ejecting a free fluid jet 109. As can be seen, the free fluid jet 109 exits on that side of the nozzle 107 which faces away from the pump 101, and keeps moving in a direction facing away from the pump 101, depicted by the arrow 110.

Figure 2A:
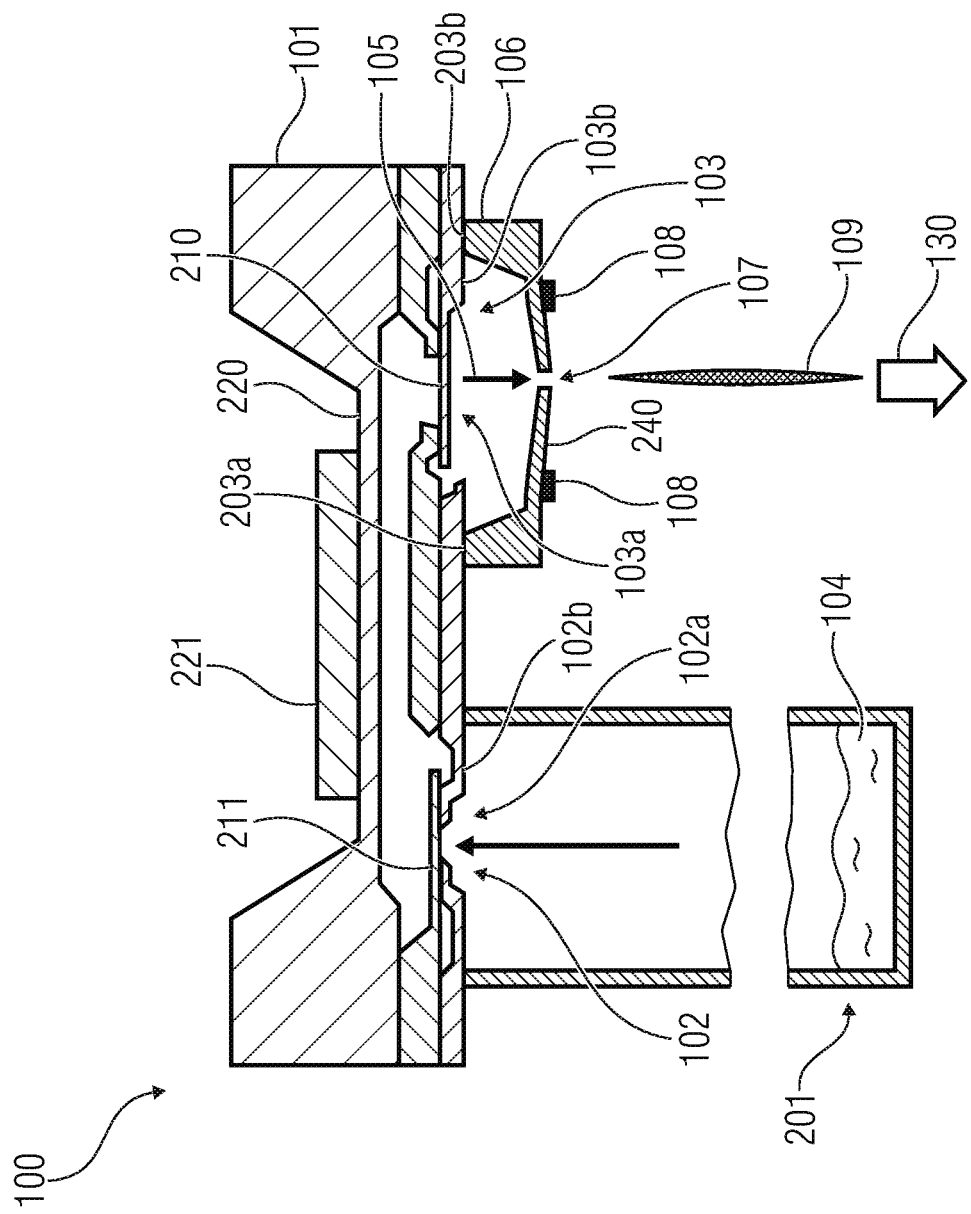
FIG. 2A shows a sectional side view of an inventive free-jet dosing system in accordance with a first embodiment.

FIG. 2A shows an embodiment of the inventive free-jet dosing system 100. The free-jet dosing system 100 comprises a pump 101. The pump 101 has an inlet 102 and an outlet 103.

More specifically, the inlet 102 has an inlet opening 102a and an edge portion 102b surrounding the inlet opening 102a. The outlet 103 comprises an outlet opening 103a and an edge portion 103b surrounding the outlet opening 103a. In the embodiment shown in FIG. 2A, the edge portion 102b surrounding the inlet opening 102a and the edge portion 103b surrounding the outlet opening 103a are configured in one piece.

In accordance with this embodiment, the dosage monitoring device 106 is arranged on the outlet side and to be at least partly in contact with the outlet 103 of the pump 101. More specifically, the portions 203a, 203b of the dosage monitoring device 106 which are adjacent to the pump 101 are in contact with that edge portion 103b of the outlet 103 which surrounds the outlet opening 103a.

The pump 101 is configured to suck in, through the inlet 102, the fluid to be dispensed 104. A reservoir 201, which stores the fluid to be dispensed 104, may be arranged on the inlet side of the pump 101. It is from this reservoir 201 that the pump 101 sucks in the fluid to be dispensed 104.

However, there may also be provided both a reservoir 201 arranged on the inlet side and a reservoir arranged on the outlet side (the latter not being shown here). The fluid pressures of both reservoirs may be configured to be equal in quantity. In this case, the microdosing system 100 would consequently exhibit approximately the same pressure on the inlet side as on the outlet side. In this manner, a free flow of fluid between the inlet 102 and the outlet 103 is prevented.

However, the pressure of the reservoir arranged on the outlet side may also be larger than the pressure of the inlet-side reservoir 210. Here, the check valve 210 described below ensures that no backflow may take place from the outlet-side reservoir to the pump 101.

The pump 101 is further configured to dispense at least some of the fluid, indicated by arrow 105, from the outlet 103.

The dosage monitoring device 106 arranged on the outlet side comprises an opening 107 through which the fluid to be dispensed 105 may pass. The opening 107 here acts as a nozzle through which a free jet 109 may be ejected.

The dosage monitoring device 106 further comprises a flow rate measuring means 108. The flow rate measuring means 108 is configured to determine the flow rate of the fluid 105 passing through the opening 107 formed in the dosage monitoring device 106. In other words, the dosage monitoring device 106 monitors the amount of fluid dispensed.

Monitoring of the flow rate by means of the dosage monitoring device 106 here is effected as follows:

The opening 107 formed in the dosage monitoring device 106 may also be referred to as an orifice plate. The flow rate measuring means 108 may be a pressure sensor, for example, which measures the pressure applied upstream from the orifice plate 107 and the pressure applied downstream from the orifice plate 107, and which may determine the differential pressure. As will be described below, the flow rate which has passed through the orifice plate 107 may be determined by means of the differential pressure. By temporally integrating the flow rate, the flow volume of the fluid 105 which has flowed through may be determined. Thus, the free-jet dosing system 100 may monitor the amount of fluid to be dispensed 105 in the form of a free jet 109 and may dose it accurately.

The opening, or orifice plate, 107 forms a defined flow resistor for the fluid 105 flowing through. The volume flow, or the volume flow rate or mass flow rate, flowing through said flow resistor 107 is a function of the pressure applied thereat. The volume flow Q is (in compressible liquids not having excessive viscosities according to Toricelli's law) proportional to the square root of the differential pressure $\Delta p$ between the pressure $p_1$ measured upstream from the orifice plate 107 and the pressure $p_2$ measured downstream from the orifice plate 107, with a proportionality constant c.

$$Q = c \cdot \sqrt{p_2 - p_1} = c \cdot \sqrt{\Delta p}$$

or generally:

$$Q = \mu A \sqrt{\frac{2\Delta p}{\rho}}$$

with the orifice plate area A and the density $\rho$ of the liquid. The discharge coefficient $\mu$ is composed of the coefficient of contraction □□□ which describes the constriction of the flow path in the event of sharp edges of the orifice plate) and the coefficient of velocity □ (which describes the influence of the (small) friction losses at the orifice plate).

The above root-shaped Toricelli relationship further is based on the precondition that the opening 107 is an "orifice plate", which means that the diameter (or the typical dimension of a non-round, e.g., square, orifice plate) of the opening 107 is considerably larger than the thickness of the orifice plate 107. This is the case, e.g., when the opening 107 of the dosage monitoring device 106 is realized, e.g., by a dry-etching step on a pressure sensor membrane of silicon, which typically has a membrane thickness of 10 to 50 μm and a typical membrane side length of 1 to 3 mm, and the diameter of the orifice plate 107 has a value ranging from 50 to 1500 μm. If the diameter of the opening 107 is considerably larger than the thickness of the orifice plate 107, the potential energy of the fluid 105 will mainly be converted to kinetic energy, which results in the above-mentioned Toricelli's law. In this case, the influence of friction on the orifice plate flow is small, which has the advantage that the flow of liquid through the orifice plate 107 is essentially independent of temperature since the density is essentially independent of temperature, while the viscosity in liquids is highly dependent on temperature. What is disadvantageous here is that (due to the steep root characteristic present in small sensor signals) the dosage monitoring device 106 is less sensitive in the case of small flow values.

If the diameter of the orifice plate 107 is not considerably larger than the thickness of the orifice plate 107, the influence of friction will increase. The root characteristic will then get a linear portion. However, this is irrelevant with regard to the function of the free-jet dosing system 100 since in this case, too, the relationship between the pressure sensor signal and the flow may be determined. Since the influence of temperature on the viscosity is also known, this temperature influence may be measured by measuring the temperature (as was already described above for gas flow) and may be compensated for. Moreover, a channel flow has the advantage that there is an approximately linear relationship between the flow and the pressure drop, which is generally known in a round channel geometry from the Hagen-Poiseuille law.

As a result it is possible, e.g., to realize also orifice plate diameters equal to or smaller than the orifice plate thickness (whereby the orifice plate 107 becomes a channel), and thus, it is also possible to implement free-jet dosing systems 100 which may monitor and dose very small volumes.

The volume flow and/or the flow rate Q further is the temporal derivation of the volume of the fluid to be dispensed, said volume flowing through the defined flow resistor (corresponds to the diameter of the orifice plate opening 107) during a time unit.

$$Q = \dot{V} = \frac{dV}{dt}$$

Integrating the volume flow Q yields the volume of the medium which has flowed through during this time period.

$$V = \int_{t_1}^{t_2} Q \, dt$$

As was already mentioned above, a fluid to be dispensed 105 may also be a gas. In this case, the volume of the gas will change as the temperature changes. This is why it may be advantageous for the free-jet dosing system 100 to comprise a temperature sensor (not shown here) configured to determine the temperature of the gas passing through the orifice plate opening 107 so as to determine the corresponding volume of the gas. Advantageously, the temperature sensor is integrated in the dosage monitoring device 106. If the dosage monitoring device 106 is configured, e.g., as a microflow sensor in the form of a semiconductor chip, the temperature sensor may also be configured within said semiconductor chip.

According to the invention, the opening 107 formed in the dosage monitoring device 106 is configured to serve as an outlet nozzle for ejecting the fluid 105 in the form of a free fluid jet 109. The outlet nozzle 107 is further configured to have a jet-shaping action, i.e., the outlet nozzle 107 is shaped such that the fluid to be dispensed 105 is ejected as a coherent free jet 109. In this context, the pump 101 may generate pressures of up to 40 bar.

On its outlet side, the pump 101 comprises a check valve 210 which closes the outlet 103 when the pump 101 sucks in the fluid to be dispensed 104, i.e., when the pump 101 performs a suction stroke. The outlet-side check valve 210 opens the outlet 103 when the pump 101 dispenses the fluid to be dispensed 105 from the outlet 103, i.e., when the pump 101 performs a pressure stroke. The outlet-side check valve 210 thus closes the outlet 103 while the pump 101 performs a suction stroke, and opens the outlet 103 while the pump 101 performs a pressure stroke.

FIG. 2B once again shows the free-jet dosing system of FIG. 2A; however—for improved clarity—it omits some of the above-described features such as the inlet-side reservoir 201, for example.

Figure 2B:
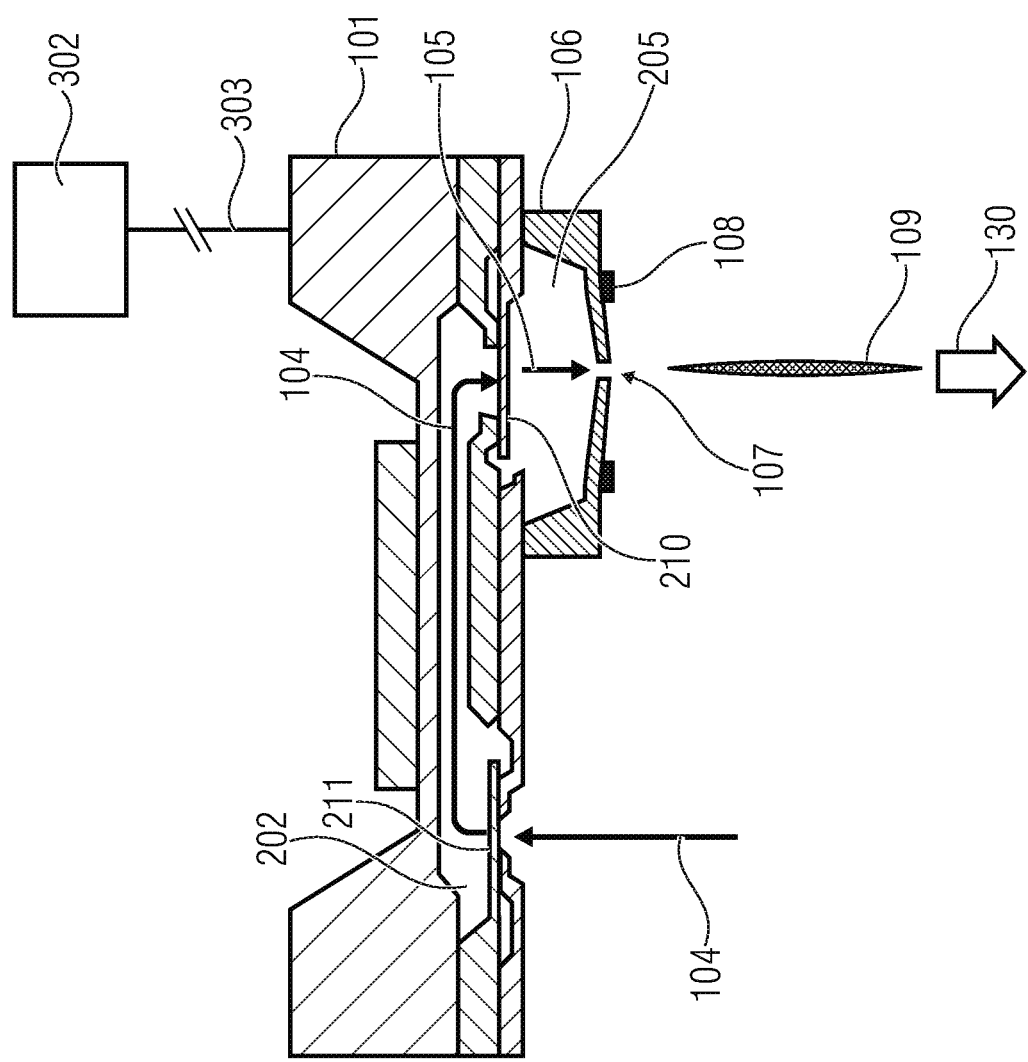
FIG. 2B shows a further sectional side view of the inventive free-jet dosing system of FIG. 2A.

One can see in FIG. 2B that the pump 101 comprises a check valve 211 on the inlet side as well. The inlet-side check valve 211 opens the inlet 102 when the pump 101 sucks in the fluid to be dispensed 104. In contrast, the inlet-side check valve 211 closes the inlet 102 when the pump 101 dispenses the fluid to be dispensed 105 from the outlet 103. The inlet-side check valve 211 thus opens the inlet 102 while the pump 101 performs a suction stroke and closes the inlet 102 while the pump 101 performs a pressure stroke.

The pump 101 used in the inventive free-jet dosing system 100 may advantageously be configured as a micropump having small dimensions. The micropump 101 comprises a pump chamber 202 which is arranged between the inlet 102 and the outlet 103 and through which the fluid to be dispensed is delivered from the inlet 102 to the outlet 103.

Additionally, the micropump 101 comprises a membrane 220 arranged, at least in sections, in the region of the pump chamber 202, and a membrane deflection means 221. The membrane deflection means 221 is configured to deflect the membrane 220 such that the volume of the pump chamber 202 is enlarged for sucking in the fluid to be dispensed 104, and the volume of the pump chamber 202 is reduced for dispensing the fluid to be dispensed 105.

In this micropump, the lateral dimension of the pressure sensor membrane 220 advantageously ranges from 2×2 mm$^2$ to 5×5 mm$^2$, for example. The membrane thickness advantageously ranges from 20 μm to 60 μm. The diameter of the opening, or nozzle, 107 may range from 10 μm to 100 μm, for example. The membrane 220 may also have a plurality of openings, or nozzles, 107 provided therein.

The membrane deflection means 221 advantageously is a piezoelement configured to deflect the membrane 220 as a function of the voltage applied to the piezoelement 221.

As can further be seen in FIG. 2B, the dosage monitoring device 106 arranged on the outlet side comprises a cavity 205 which is arranged to face the outlet 103 of the pump 101. Thus, the cavity 205 is arranged between the outlet nozzle 107 and the pump outlet 103. Said cavity 205 has fluid to be dispensed 105 contained therein. Typically, the cavity 205 is completely filled with the fluid 105, provided that there are no gas bubbles within the cavity 205.

Since the opening 107 of the dosage monitoring device 106 is configured as an outlet nozzle, the cavity 205 is also referred to as a nozzle chamber. As can be seen in FIGS. 2A and 2B, the outlet-side check valve 210 is arranged between the pump chamber 202 and the nozzle chamber 205. The outlet-side check valve 210 thus provides a spatial and fluid-tight separation between the nozzle chamber 205 and the pump chamber 202.

Should the outlet-side check valve 210 leak, fluid to be dispensed 105 will flow, for example when the pump 101 is inactive, from the pump chamber 202 past the leaking check valve 210 and into the nozzle chamber 205 past the leaking check valve 210. The quantity of fluid to be dispensed 105 within the nozzle chamber 205 will then increase and may exit the dosage monitoring device 106 through the opening 107.

The inventive free-jet dosing system 100 may detect such a leaking check valve 210 in that excess fluid volume exiting from the dosage monitoring device 106 through the opening 107 is measured by means of the flow rate measuring means 108.

In the event that an outlet-side check valve 210 is leaking, it may also occur that the fluid 105 located within the nozzle chamber 205 is sucked from the nozzle chamber 205 into the pump chamber 202 during a suction stroke of the pump 101. Moreover, a leaking outlet-side check valve 205 is disadvantageous to the effect that air might be sucked in through the nozzle 107 during a suction stroke, which air may settle as a gas bubble within the nozzle chamber 105 and/or within the pump chamber 202.

To be able to detect a leaking outlet-side check valve 210 it is advantageous for the free-jet dosing system 100 to know the state the pump 101 is currently in. The existence of a leaking outlet-side check valve 210 typically is plausible only when the pump 101, as was described above, during measuring of a fluid flow through the nozzle 107, is either in an inactive state or is performing a suction stroke. For in said pump states, an outlet-side check valve 210 which is in a proper condition is closed in a fluid-tight manner.

In order to enable the inventive free-jet dosing system 100 to establish synchronization between the pump state and the flow rate measurement, the free-jet dosing system 100 comprises control means 302 recognizing the operating state of the pump 101.

The control means 302 may be a suitable microcontroller, for example. The control means 302 is connected to the free-jet dosing system 100 via a wired or wireless connection 303. The control means 302 is advantageously connected to both the pump 101 and the dosage monitoring device 106.

The control means 302 is configured to control the flow rate measuring means 108 and the pump 101 such that the dosage monitoring device 106 will detect, by means of the flow rate measuring means 108, a fluid flow exiting from the nozzle 107 to the outside even when the pump 101 is in an inactive state.

Moreover, the control means 302 detects when fluid unintendedly flows from the nozzle chamber 205 to the pump chamber 202 when the pump 101 sucks in the fluid to be dispensed 104, i.e., when the pump 101 performs a suction stroke.

Thus, one may infer a leaking outlet-side check valve 210 since an intact check valve 210 is closed in a fluid-tight manner while the pump 101 is inactive or performs a suction stroke and since the leakage currents described above therefore should not occur in case of an intact valve 210.

Figure 3:
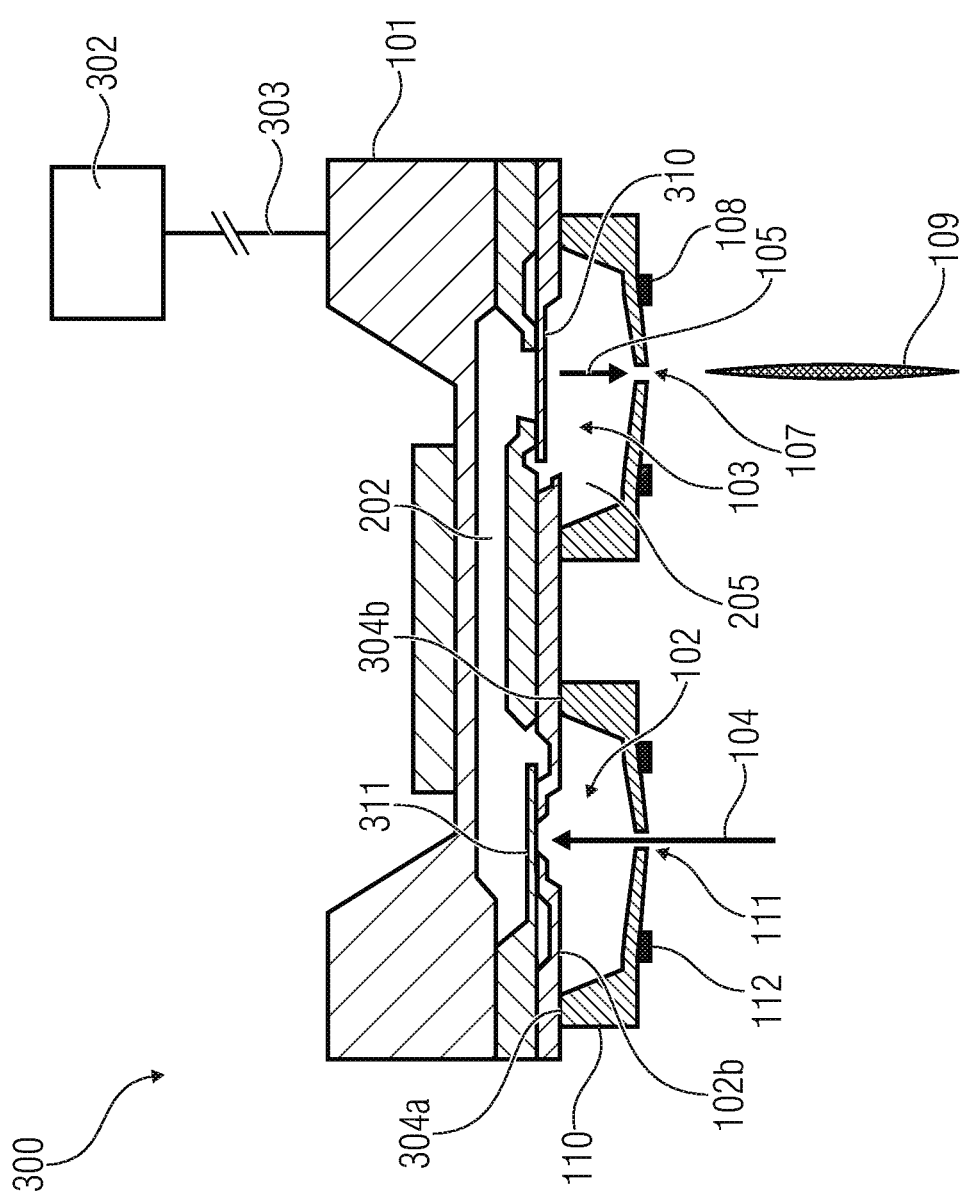
FIG. 3 shows a sectional side view of an inventive free-jet dosing system in accordance with a second embodiment.

FIG. 3 shows a further embodiment of an inventive free-jet dosing system 300. This embodiment differs from the embodiments discussed so far in that a flow sensor 110 is provided on the inlet side. The other features of the free-jet dosing system correspond to those described above with reference to FIGS. 1, 2A and 2B, which is why the same reference numerals are used for the same features.

The flow sensor 110 comprises an opening 111 and a flow rate measuring means 112. The flow rate measuring means 112 is configured to determine the flow rate of the fluid 104 passing through said opening 111. The flow rate measuring means 112 of the flow sensor 110 operates by analogy with the above-described flow rate measuring means 108 of the dosage monitoring device 106.

According to this embodiment, the flow sensor 110 is arranged to be in contact, on the inlet side and at least in sections, with the inlet 102 of the pump 101. More specifically, those portions 304a, 304b of the flow sensor 110 which are adjacent to the pump 101 are in contact with that edge portion 102b of the inlet 102 which surrounds the inlet opening 102.

The free-jet dosing system 300 comprises, on the outlet side, a valve 310 configured to close the outlet 103 when the pump 101 sucks in the fluid to be dispensed 104. The valve 310 is further configured to open the outlet 103 when the pump 101 dispenses the fluid to be dispensed 105 from the outlet 103.

The free-jet dosing system 300 comprises, on the inlet side, a valve 311 configured to open the inlet 102 when the pump 101 sucks in the fluid to be dispensed 104, and configured to close the inlet 102 when the pump 101 dispenses the fluid to be dispensed 105 from the outlet 103.

The free-jet dosing system 300 comprises control means 302. The control means 302 may be a suitable microcontroller, for example. The control means 302 is connected to the free-jet dosing system 300 via a wired or wireless connection 303. The control means 302 is advantageously connected to the pump 101 as well as to the dosage monitoring device 106 and to the flow sensor 110.

The control means 302 is configured to control the pump 101 and the dosage monitoring device 106 arranged on the outlet side and the flow sensor 110 arranged on the inlet side such that both the dosage monitoring device 106 and the flow sensor 110 determine the flow rate of the fluid 104, 105 flowing through the respective opening 107, 111 of the dosage monitoring device 106 and/or of the flow sensor 110 when the pump 101 sucks in the fluid to be dispensed 104.

This means that during the suction process, i.e., during the suction stroke of the pump 101, the fluid 104 located on the inlet side flows through the opening 111 of the flow sensor 110. During the suction stroke of the pump 101, the valve 311 arranged on the inlet side opens, and the fluid to be dispensed 104 can flow into the pump chamber 202.

At the same time, the valve 310 arranged on the outlet side closes the outlet 103 during the suction stroke of the pump 101. An intact valve 310 closes the outlet 103 in a fluid-tight manner. Should the valve 310 arranged on the outlet side be faulty, air is possibly sucked in during the suction stroke of the pump 101, which air may settle within the nozzle chamber 205 and/or within the pump chamber 202 in the form of a gas bubble.

When the pump 101 is inactive, fluid may exit the pump chamber 202 through a leaking valve 310 and may flow to the dosage monitoring device 106 through the outlet 103. Said fluid which has leaked will pass through the opening 107 of the dosage monitoring device 106, and the flow rate of this fluid which has leaked is determined by means of the flow rate measuring means 108. The free-jet dosing system 300 may thus detect an outlet-side leakage current.

Not only can the free-jet dosing system 300 detect, during the suction stroke of the pump 101, a leakage current of the valve 310 arranged on the outlet side. The free-jet dosing system 300 may also detect, during the suction stroke of the pump 101, a leakage current of the valve 311 arranged on the inlet side.

To this end, the control means 302 is configured to control the pump 101 as well as the dosage monitoring device 106 and the flow sensor 110, which is arranged on the inlet side, such that both the dosage monitoring device 106 and the flow sensor 110 determine the flow rate of the fluid 104, 105 flowing through the respective opening 107, 111 of the dosage monitoring device 106 and/or of the flow sensor 110 when the pump 101 dispenses the fluid to be dispensed 105 from the outlet 103.

This means that while the fluid 105 is being ejected, or during the pressure stroke of the pump 101, the valve 310 arranged on the outlet side opens, and the fluid to be dispensed 105 can flow out from the pump chamber 202 toward the dosage monitoring device 106 through the outlet 103, which is indicated by the arrow 105. The fluid to be dispensed 105 then flows through the opening 107, formed as a nozzle, of the dosage monitoring device 106 arranged on the outlet side and is ejected from the nozzle 107 in the form of a free jet. The flow rate of the fluid to be dispensed 105 is determined by means of the flow rate measuring means 108.

At the same time, the valve 311 arranged on the inlet side closes the inlet 102 during the pressure stroke of the pump 101. An intact valve 311 will close the inlet 102 in a fluid-tight manner. Should the valve 311 arranged on the inlet side be faulty, fluid will flow from the pump chamber 202 through the inlet 102 back to the flow sensor 110 arranged on the inlet side. Said returned fluid will pass the opening 111 of the flow sensor 110, and the flow rate of this returned fluid will be determined by means of the flow rate measuring means 112. The free-jet dosing system 300 may thus detect a leak in the inlet-side check valve 311 by means of the flow sensor 110.

The inventive free-jet dosing system 300 may additionally detect leakage currents at the inlet-side valve 311 and/or at the outlet-side valve 310 when the pump 101 is inactive, or idle, i.e., when it performs neither a suction stroke nor a pressure stroke.

To this end, the control means 302 is configured to control the pump 101 and the dosage monitoring device 106 and/or the flow sensor 110 such that the dosage monitoring device 106 and/or the flow sensor 110 determines the flow rate of the fluid 104, 105 flowing through the opening 107, 111 of the dosage monitoring device 106 and/or of the flow sensor 110 when the pump 101 is not being actuated.

When the pump 101 is inactive, or is not being actuated, there will be no negative or positive pressure within the pump chamber 202. The fluid to be dispensed will thus be at an atmospheric pressure within the pump chamber 202. In this state, both the inlet-side valve 311 and the outlet-side valve 310 are closed in a fluid-tight manner.

Should any fluid located within the pump chamber 202 nevertheless leak from the pump chamber 202, said leaked fluid will flow to the dosage monitoring device 106 and/or to the flow sensor 110 and pass through the opening 107, 111 of the dosage monitoring device 106 and/or of the flow sensor 110. The flow rate of the leaked fluid is determined by means of the respective flow rate measuring means 108, 112.

Since the control means 302 knows that the pump 101 is in an inactive state, a fluid flow detected by the dosage monitoring device 106 and/or by the flow sensor 110 is recognized as a defect. The inventive free-jet dosing system 300 thus is given the information that the inlet-side valve 311 and/or the outlet-side valve 310 are leaking, and which of the two valves 310, 311 it is that is leaking. The respective leakage rate of a leaking valve 310, 311 may be determined on the basis of the flow rate, determined by the respective flow rate measuring means 108, 112, of the fluid which has exited.

The free-jet dosing system 300 may also determine the pump stroke volume during the suction stroke of the pump 101 on the basis of the flow rate, determined by the flow sensor 110 arranged on the inlet side, of the fluid 104. The free-jet dosing system 300 obtains information about how much fluid 104 has flowed in through the flow sensor 110 arranged on the inlet side and how much fluid 104 therefore is located within the pump chamber 202.

The free-jet dosing system 300 may also determine the pump delivery volume during the pressure stroke of the pump 101 on the basis of the flow rate, determined by the dosage monitoring device 106 arranged on the outlet side, of the fluid. The free-jet dosing system 300 thus obtains information about how much fluid 105 has flowed through the dosage monitoring device 106 arranged on the outlet side, and how much fluid 105 has consequently flowed out of the pump chamber 202.

The measured amount sucked in by the pump 101 during the suction stroke and measured by means of the flow sensor 110 arranged on the inlet side may be compared to the amount dispensed, which is measured by means of the dosage monitoring device 106 arranged on the outlet side. A deviation may indicate a defect. If the pump 101 sucks in more fluid than it dispenses, for example, one may conclude that there is a leak, e.g., a leaking inlet-side check valve 311. In the event of such a defect, a signal may be generated, e.g., "faulty inlet valve", which draws the user's attention to the defect or automatically switches off the pump 101.

To this end, the flow rate measuring means 108 is configured to compare the amount, or the dosing volume, of a free fluid jet 109 which has been dispensed to an amount, or dosing volume, comparison value and to generate a signal if the amount or dosing volume dispensed is smaller than the amount, or dosing volume, comparison value. The amount, or dosing volume, comparison value may be determined by means of the amount sucked in that was determined by means of the flow sensor 110, as has just been described. The amount, or dosing volume, comparison value may also be a stored value, however. A comparison between the dosing volume actually dispensed and/or measured by means of the flow rate measuring means 108 and a predefined dosing volume comparison value may also be performed by the control means 302.

A major advantage of the inventive free-jet dosing system 100, 300 is the fact that measurement of the flow by means of the dosage monitoring device 106 is very fast, i.e., pressure variations and, thus, flow variations up to below 1 ms may be resolved. This has already been verified by means of measurement technology (Proceeding MEMS 99, Orlando/USA, Jan. 17-21, 1999, pp. 118-123).

This is advantageous, in particular, since the variations of the pump chamber pressure and also the variations of the flow into and out of the pump chamber also take place very fast. Because of the very fast dosage monitoring device 106, not only may faults be therefore detected, but the normal pump function may also be continuously monitored.

In the embodiment shown in FIGS. 2A, 2B and 3, the pump 101 is configured to be an intermittently operating pump, i.e. the pump 101 generates a pressure pulse, or a sequence of pressure pulses. Thus, the dosage monitoring device 106, or the nozzle 107, has a transient, time-variable pressure signal applied to it.

Detection of a previously mentioned disturbance such as a leaking check valve 210, 211; 310, 311 or a blockage of the outlet nozzle 107, for example, may be enabled by analyzing said transient signal. In the event of a static flow, the dosage monitoring device 106 cannot distinguish whether or not the nozzle 107 is blocked. However, the transient, time-dependent signal applied to the dosage monitoring device 106 differs in terms of whether or not the nozzle 107 is blocked. If the nozzle 107 is not blocked, the pressure pulse generated by the pump 101 will decrease again within a few milliseconds. However, if the nozzle 107 is blocked, an overpressure will build up which cannot flow off. This can be detected by means of a signal analysis of the dosage monitoring device 106. The signal analysis may be performed by the control means 302.

To this end, the flow rate measuring means 108 is configured to determine a time-variable value of a fluid pressure applied at the opening, or nozzle, 107 of the dosage monitoring device 106 arranged on the outlet side. Integrating several values over time leads to an actual pressure characteristic of the dosage monitoring device 106 and/or of the nozzle 107.

The opening, or nozzle, 107 moreover comprises a static characteristic, or a target characteristic, which indicates the temporal pressure distribution of the fluid 105 flowing through as well as the flow rate. The flow rate measuring means 108 is configured to measure the time-variable fluid pressure applied at the opening, or nozzle, 107 and to transmit a corresponding signal to the control means 302. The control means 302 is configured to determine the time-dependent fluid flow through the opening, or nozzle, 107 in accordance with the above-mentioned mathematical equations by means of the pressure signal and on the basis of the knowledge of the static characteristic of the opening, or nozzle, 107. Moreover, the control means 302 is configured to integrate the fluid flow thus determined over time so as to determine the volume of the free fluid jet 109 to be dosed.

As was already mentioned at the outset, the presence of gas bubbles in free-jet dispensers is a possible source of defects which may restrict the correct functioning of the free-jet dispenser or may even lead to a total failure of the free-jet dispenser.

The inventive free-jet dosing system 100, 300 may detect gas bubbles which may occur at various positions within the free-jet dosing system 100, 300.

Figure 4:
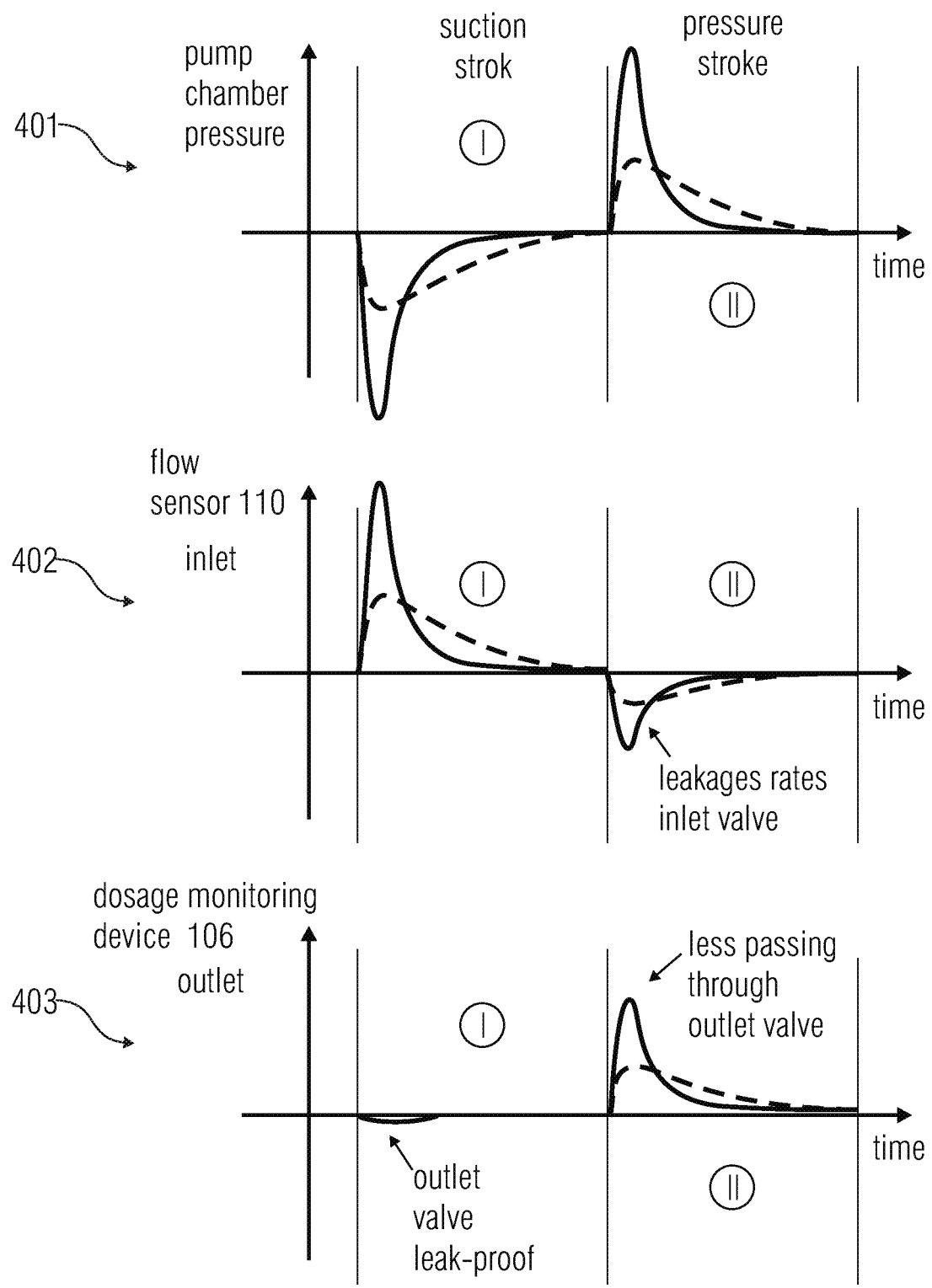
FIG. 4 shows diagrams depicting various pressure curves.

FIG. 4 shows a first diagram 401 wherein the pump chamber pressure (y axis) is plotted over time (x axis), a second diagram 402 wherein the flow on the flow sensor 110 arranged on the inlet side is plotted over time, and a third diagram 403 wherein the flow present at the dosage monitoring device 106 arranged on the outlet side is plotted over time. During a first time interval I, the pump 101 is in a suction stroke. During a second time interval II, the pump 101 is in a pump stroke, or pressure stroke.

FIG. 4 shows the time-dependent pump chamber pressure curve and the flows through the pump valves 210, 211; 310, 311 and, thus, through the dosage monitoring device 106 arranged on the outlet side as well as through the flow sensor 110 arranged on the inlet side for different states. Said states show a pump 101 having no gas bubble contained therein (solid line) and a pump 101 having one or more gas bubbles contained therein (dashed line). At the same time, the time-dependent flows measured by the dosage monitoring device 106 and the flow sensor 110 are shown.

What is shown is the situation wherein a voltage signal, wherein the voltage builds up and decreases very fast, is applied to the piezoelement (membrane deflection means) 221. For example, if the electric capacitance of the piezoceramic $C_{piezo}$=10 nF and the charging resistance (or the internal resistance of a battery) amounts to 1 kOhm, the electric voltage will build up or decrease at a time constant $\tau$=R*C=1 kOhm*10 nF=10 microseconds.

$$\tau_{el}=R_{el}C_{piezo}$$

Further, pressure signals may propagate very fast. This takes place at sound velocity of approximately 300 m/s in air or 1,000 m/s in liquids or solids. With a typical thickness and length of the pump of 1 . . . 10 mm, the pressure signal will have propagated anywhere inside the pump within a few microseconds.

Thus, the pressure signal has a similar speed as the electric signal; at any rate, it is much faster than the fluidic equalization processes.

Thus, these times are very fast compared to the fluidic times within the millisecond range. Thus, the negative pressure in the suction stroke and the overpressure in the pressure stroke build up very fast. During this short time, no significant equalization flow can flow through the check valves 210, 211; 310, 311. This explains the large pressure amplitude that is present within the pump chamber 202 immediately after switching on and off the voltage.

By the pressure signals, the respective valves 210, 211; 310, 311 are reverse-biased, the valve flaps open, and the fluid can flow in and out of the pump chamber 202. This equalization process can also be approximately described by a time constant; the fluidic forward resistances $R_{fl}$ of the microvalves 210, 211; 310, 311 (in the suction stroke essentially the resistance of the inlet valve 211; 311, in the pressure stroke the resistance of the outlet valve 210; 310 when there are no leakage rates) and the pump chamber 202 $R_{PK}$ and the fluidic capacitances of the driving membrane $C_M$ and of a potential gas bubble within the pump chamber $C_{gas}$ now become effective:

$$\tau_{fl}=(R_{fl}+R_{PK})(C_M+C_{gas})$$

The presence of a gas bubble within the pump chamber 202 represents a disturbance variable whose effect is a fluidic capacitance having a greater or lesser extent (depending on the size of the gas bubble). This has two consequences for the transient signals: the amplitude is reduced and the equalization process for the respective pump stroke is prolonged. This effect depends on the size of the fluidic capacitance and, thus, on the size of the gas bubble. Consequently, not only can the dosage monitoring device 106 as well as the flow sensor 110 detect the presence of a gas bubble, but the size of the gas bubble may also be quantified.

A gas bubble may therefore occur within the pump chamber 202, for example. As was described above, a gas bubble within the pump chamber 202 results in that the pressure amplitude becomes smaller and that pressure equalization at the nozzle 107 takes longer. To determine this, the flow rate measuring means 108 is configured to determine, when a free jet 109 is dispensed, i.e., when a pump stroke is performed, a value of the amplitude of the fluid pressure applied at the opening, or nozzle, 107 of the dosage monitoring device 106.

The free-jet dosing system 100 is configured to compare this measured amplitude value, i.e., actual value, to an amplitude comparison value, i.e., target value. The comparison may be performed by the control device 302, for example. The amplitude comparison value is a value corresponding to the target nozzle pressure prevailing in the normal state of the pump.

The flow rate measuring means 108 is further configured to measure the time period taken for pressure equalization at the opening, or nozzle, 107. More specifically, the control device 302 measures the time period within which the flow rate measuring means 108 sends a pressure equalization signal.

The free-jet dosing system 100 is further configured to compare this measured time period, i.e., the actual value, to a time period comparison value, i.e., target value. The comparison may be performed by the control device 302, for example. The time period comparison value is a value which corresponds to the target period of time taken for pressure reduction at the nozzle 107 in the normal state of the pump.

If the comparison results in a deviation between the actual value and the target value, i.e., if the determined amplitude value is smaller than the amplitude comparison value and if the measured time period taken for pressure equalization is larger than the time comparison value, the free-jet dosing system 100 may conclude that a gas bubble is contained within the pump chamber 202.

However, a gas bubble may also be contained within the nozzle chamber 205, for example. The presence of a gas bubble within the nozzle chamber 205 results, depending on the size of the gas bubble, in the gas bubble being compressed by the pressure pulse, whereby the pressure amplitude decreases and the rising edges are delayed.

To determine this, the flow rate measuring means 108 is configured to determine, while a free jet 109 is being dispensed, i.e., when a pump stroke is performed, an instantaneous value of the amplitude of the fluid pressure applied at the opening, or nozzle, 107 of the dosage monitoring device 106.

The free-jet dosing system 100 is configured to compare this measured amplitude value, i.e., actual value, to an amplitude comparison value, i.e., target value. The comparison may be performed by the control device 302, for example. The amplitude comparison value is a value corresponding to the target nozzle pressure prevailing in the normal state of the pump.

The flow rate measuring means 108 is further configured to measure the time period taken for pressure increase at the opening, or nozzle, 107. More specifically, the control device 302 measures the time period within which the flow rate measuring means 108 sends a pressure increase signal.

The free-jet dosing system 100 is further configured to compare this measured time period taken for the pressure increase, i.e., the actual value, to a time period comparison value, i.e., target value. The comparison may be performed by the control device 302, for example. The time period comparison value is a value which corresponds to the target period of time taken for pressure increase at the nozzle 107 in the normal state of the pump.

If the comparison results in a deviation between the actual value and the target value, i.e., if the determined amplitude value is smaller than the amplitude comparison value and if the measured time period taken for pressure increase is larger than the time comparison value, the free-jet dosing system 100 may conclude that a gas bubble is contained within the nozzle chamber 205.

As long as in the event of a gas bubble being present, the pressure amplitudes are sufficiently large so that the microvalves 210, 211; 310, 311 can be opened, the entire stroke may further be accomplished but will take slightly longer. However, it is clear that when the operating frequency f=1/T of the pump 101 becomes large enough, it may occur that the delays caused by the gas bubble result in that the pump stroke cannot be fully accomplished any longer if the time available for the suction and pressure strokes becomes shorter than the equalization operations that may be performed.

This would be mean that the volume delivered per pump cycle at this higher operating frequency is larger when no gas bubble is present than in the case where a gas bubble is present. Thus, at high operating frequencies, the gas bubble will change the amount delivered per pump cycle and, thus, the pumping rate. However, both of these may be accurately detected by the dosage monitoring device 106 as well as the flow sensor 110. The free-jet dosing system 100 therefore may not only measure the reduction in the amount delivered but may also determine its cause, namely the entry of a gas bubble into the pump chamber 202.

FIG. 4 also shows the case that the inlet valve 211, 311 is leaking and that during the pressure stroke, only 60% is delivered in the correct direction per time unit, whereas 40% flows back through the leaking inlet valve 211, 311.

The advantage of the transient analysis can also be seen from the following example: if the pump 101 is inactive and/or when the microvalves 210, 211; 310, 311 are closed, no flow should occur through the microdosing system 100. If the dosage monitoring device 106 (and/or the flow sensor 110) shows a difference value compared to a previous calibration, this may have two causes: firstly, the dosage monitoring device 106 (and/or the flow sensor 110) may have drifted in the meantime, or a leakage rate may have formed (e.g. due to particles) inside the microvalve 210, 211; 310, 311. These possible causes cannot be differentiated by the dosage monitoring device 106 (and/or the flow sensor 110) when the pump 101 is inactive. If the above-described transient measurement determines a leakage flow (e.g., the inlet-side flow sensor 110 during the pressure stroke for the inlet valve 211, 311 and the outlet-side dosage monitoring device 106 during the suction stroke for the outlet valve 210, 310), the above causes can be clearly differentiated: drifting of the dosage monitoring device 106 (and/or the flow sensor 110) is performed on a long time scale, a respective sensor pulse on the millisecond time scale can thus be allocated to a leakage.

Also, a "diagnosis routine" can determine if one of the serial valves 140a, 140b (NC, NO, DNC ...) shown in FIG. 1B has leakage rates (e.g., due to particles). In this case, the pump 101 is operated with the valve 140a, 140b closed. If the valve 140a, 140b is leak-tight, no flow may occur through the dosage monitoring device 106 and/or the flow sensor 110 during the respective pump stroke (depending on whether the valve 140a, 140b is in the suction line or the pressure line). If the dosage monitoring device 106 and/or the flow sensor 110 nevertheless determines a transient signal, a leakage of the respective valve 140a, 140b may unambiguously be inferred.

The free-jet dosing system 100 thus has several advantageous properties. For one thing, it is self-filling, and for another, it is relatively tolerant with regard to gas bubbles, even at a high compression ratio of the pump 101, such as 40 bar. By means of the check valves 210, 211; 310, 311 of the pump 101, free jets 109 may be ejected at a high repetition frequency of up to 500 Hz. By means of the integrated dosage monitoring device 106, disturbances may be detected, and the dosing amount may be monitored.

In addition to the occurrence of gas bubbles, a further problem not uncommonly associated with jet dispensers consists in the formation of satellite drops at the end of the free jet 109 which have less kinetic energy and may scatter to a larger extent.

For example, in order to create a defined jet breakage, the above-mentioned transient pressure signal applied to the nozzle 107 may be measured by means of the flow rate measuring means 108, and the movement of the drive membrane 220 of the pump 101 may be abruptly stopped during the pump stroke when the pressure applied at the dosage monitoring device 106 falls below a specific value.

Further possibilities of generating a defined jet breakage may be implemented, for example, by providing a specific shape of the nozzle 107. FIG. 5A to 5E shows such different nozzle shapes.

Figure 5A:
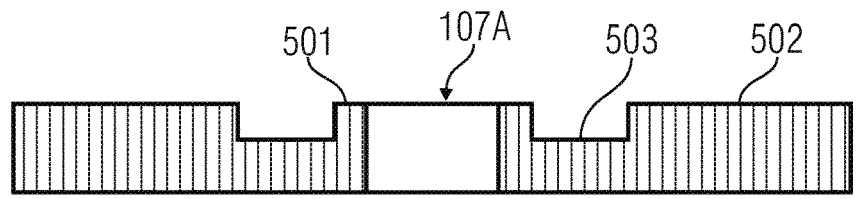
FIGS. 5A to 5E show different nozzle shapes.

FIG. 5A shows a first nozzle shape 107A. A collar 501 is configured laterally around the nozzle 107A. This collar 501 may be formed in that part of the membrane 502 is recessed laterally around the nozzle 107A, for example by means of suitable etching processes. Accordingly, therefore, a recess 503 is formed laterally around the nozzle 107A.

Figure 5B:
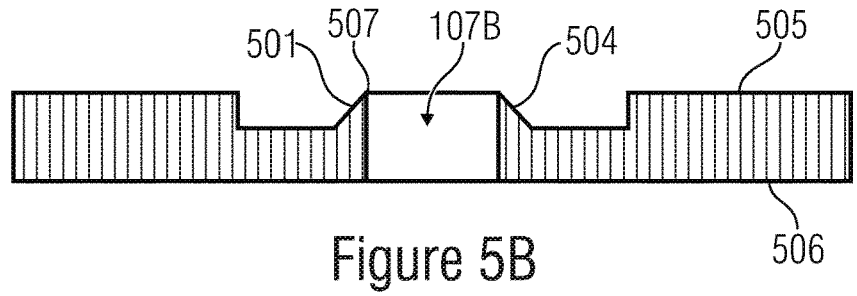

FIG. 5B shows a further nozzle shape 107B. This nozzle shape 107B differs from the above-mentioned nozzle shape 107A in that the collar 501 extends outward in a radial direction from a top side 505 of the membrane 502 to a bottom side 506 of the membrane 502. This results in an angular, or chamfered, portion 504. A sharp edge, or tip, 507, at which the exiting fluid jet may be caused to break off in a defined manner, is formed at the upper end of the chamfered portion 504.

Figure 5C:
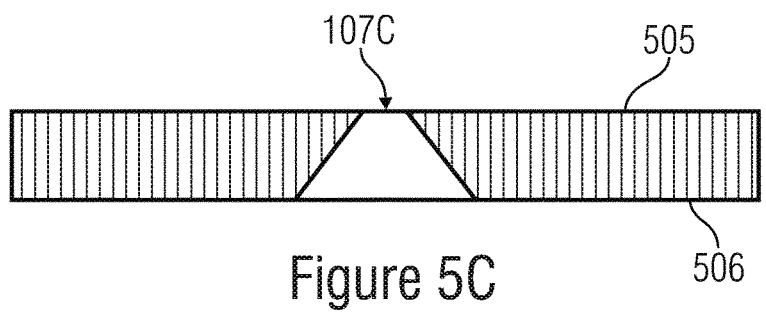

FIG. 5C shows a further nozzle shape 107C. This nozzle shape 107C differs from the above-mentioned nozzle shapes 107A, 107B in that, inter alia, the nozzle 107C is configured as a conical nozzle. This means, the nozzle 107C conically tapers in a vertical direction, i.e., in the direction from the bottom side 506 of the membrane to the top side 505 of the membrane. A conical nozzle 107C results in a jet having improved directionality.

Figure 5D:
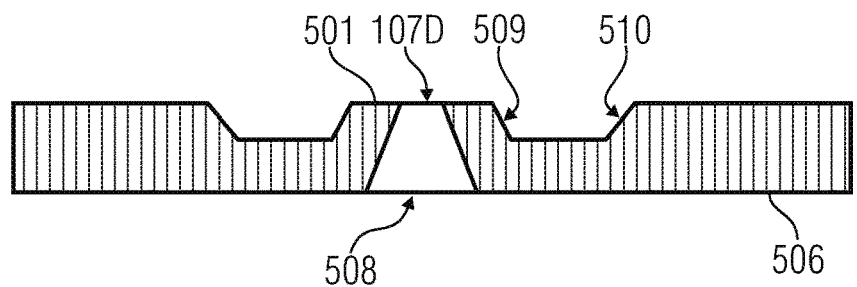

FIG. 5D shows a further nozzle shape 107D. This nozzle shape 107D differs from the above-mentioned nozzle shape 107C in that, inter alia, the opening 508 formed on the bottom side 506 of the membrane has a larger diameter. Moreover, a collar 501 laterally surrounding around the nozzle 107D is formed on the top side 505 of the membrane. The collar 501 comprises a first chamfer 509 and an opposite second chamfer 510. The chamfers 509, 510 may be formed, for example, by means of wet-chemical, anisotropic etching by using potassium hydroxide (KOH).

Figure 5E:
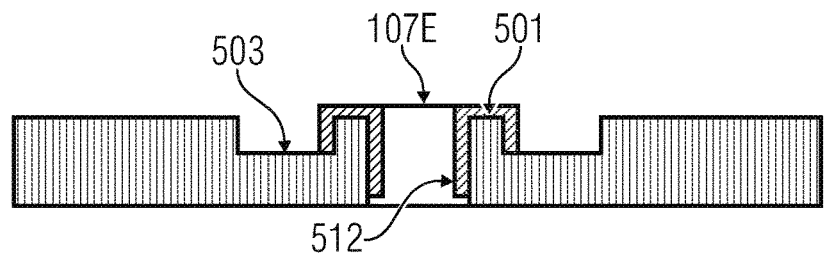

FIG. 5E shows a further nozzle shape 107E. This nozzle shape 107E differs from the above-mentioned nozzle shapes 107A to 107D in that, inter alia, the nozzle 107E comprises, at least in sections, a hydrophobic coating 512. Inter alia, the hydrophobic coating 512 is mounted, at least in sections, within the nozzle 107E. As depicted in FIG. 5E, the hydrophobic coating 512 may also extend across some of the collar 501 and, at least in sections, into the laterally surrounding recess 503.

As was already mentioned, a major advantage in utilizing the inventive free-jet dosing system 100 is that measurement of the flow is very fast, i.e., flow variations of less than 1 ms may be dissolved. This enables the following advantageous possibilities:

1) Normal Operating Mode:
   Observing the normal operating mode:
   no gas bubble present within the pump chamber 202
   no gas bubble present within the nozzle chamber 205
   valves 210, 211 intact, no leakage rates
   During ejection of the stroke volume of the pump 101 through the outlet 210, a defined, time-dependent over-pressure is generated
   This over-pressure opens the outlet valve 210
   Since the dosage monitoring device 106 is adapted, according to the invention, to the outlet 103 of the pump 101, there are no elastic elements (e.g., soft seals or tubes) between the outlet valve 210 and the nozzle 107. I.e., when there are no gas bubbles, the over-pressure of the pump 101 during ejection will be directly transferred to the nozzle 107. I.e., the pressure within the pump chamber 202 corresponds to the pressure at the nozzle 107.
   The flow rate measuring means 108, configured as a Wheatstone bridge, of the dosage monitoring device 106 measures a very rapidly increasing pressure signal at the nozzle 107 during "normal operation".
   During ejection of the jet 109 of the (incompressible) liquid, the drive membrane 220 of the pump 101 will be able to move, and accordingly, the pressure applied within the pump chamber 202 and at the nozzle 107 will decrease.
   During this "normal operation", the time-dependent flow through the nozzle 107 may be determined on the basis of the measured time-dependent pressure signal and the static characteristic of the nozzle 107.
   Said time-dependent flow may be integrated over time, and the volume dosed may be determined.

In addition, all of the embodiments of the inventive free-jet dosing system 100, 300 have the advantage of being able to be calibrated to compensate for any drifting of the dosage monitoring device 106 and/or of the second flow sensor 110.

If it is ensured by the control means 302, for example, that no fluid flow takes place, e.g. when the pump 101 is switched off, the dosage monitoring device 106 will be "set to zero", i.e., the flow rate measuring means 108 will be read out, and this read-out value will be taken as a "zero flow value", or zero point or starting point. As a result, the zero point may be re-determined prior to any or every suction stroke and/or pressure stroke of the pump 101.

With regard to this calibration and/or determination of a "zero flow value", the control means 302 is configured to detect an actual value of the sensor signal of the dosage monitoring device 106, which actual value prevails when the pump 101 is inactive, and to define said actual value as the current zero value. The control means 302 switches the pump 101 into an inactive state, i.e., the pump 101 performs neither a suction stroke nor a pressure stroke. In this inactive state of the pump 101, no fluid to be dispensed flows between the inlet 102 and the outlet 103.

It may happen, however, that the sensor signal of the dosage monitoring device 106 drifts, i.e., the value of a sensor signal considered at a time $t_1$ changes over time, such that this sensor signal has a different value at a second time $t_2$ compared to the previous time $t_1$. This can, for example, be induced by mechanical stress when housing low-cost sensors.

Thus, the control means 302 can detect the current sensor value of the dosage monitoring device 106 at any time $t_0$ and set it as a new zero value. In other words, the current sensor value can be subtracted from the measurement signal as an offset in an immediately subsequent flow measurement of the dosage monitoring device 106 by means of the flow rate measuring means 108. In this way, the free-jet dosing system 100 is recalibrated prior to a measurement.

The control means 302 is configured to determine a correction value and to subtract same from the amount of the detected actual sensor signal of the dosage monitoring device 106, wherein the obtained difference value forms a corrected starting point for the subsequent sensor signals of the dosage monitoring device 106.

Thus, when the control means 302 determines that no flow is occurring (e.g., when the pump 101 is inactive and/or when the microvalves 210, 211; 310, 311 are closed), the dosage monitoring device 106 is calibrated, or "set to zero". For example, the control means 302 can detect the current actual value of the dosage monitoring device 106 and correct same by means of a correction value in order to define the resulting signal as the current "zero flow value" and zero point or starting point.

The correction value is determined by the control means 302 and is based on the detected actual sensor signal of the dosage monitoring device 106. The correction value is subtracted from the detected actual sensor signal. The obtained difference value serves as new starting point for subsequent sensor signals. In other words, the current actual sensor signal is defined to be the new "zero signal". This new "zero signal" can be subtracted as an offset from the measurement signal in an immediately subsequent measurement of the flow sensor where the flow sensor has not yet drifted away again.

The correction value can correspond, for example, to the amount of the measured actual sensor signal and can be subtracted from same. If, for example, when the pump 101 is inactive, an actual sensor signal of ±50 mV is measured due to a sensor drift, a correction value in the amount of 50 mV can be subtracted from the amount of the actual sensor signal. This means the amount of the actual value of the sensor signal in the amount of ±50 mV is corrected by the correction value in the amount of also 50 mV. Thus, the drifting sensor signal is reset to the value of zero.

Prior to performing a measurement of a sensor signal of the dosage monitoring device 106, the correction value can be subtracted from the previously detected actual sensor signal. In that way, the "zero point" is re-determined. However, it is also feasible that the actual sensor value is at first stored as correction value and is not subtracted from this measured sensor signal until after a measurement is performed. In this case, the correction value is not subtracted from the obtained measurement value as an offset until after the measurement has been performed.

Independently of whether the correction value is subtracted from the respective sensor signal prior to or after a measurement, the amount of the sensor drift can, if the sensor signal of the dosage monitoring device 106 is subject to a time-variable sensor drift, be set to zero at any time $t_0$. The sensor drift at the time $t_0$ is hidden or corrected, so to speak, and the current zero point of the dosage monitoring device 106 is redetermined at the time $t_0$.

The amount of the correction value does not have to correspond exactly to the amount of the actual sensor signal. It is also feasible that the amount of the correction value has any value between zero and the actual value of the sensor signal. If, for example, an actual sensor signal of ±50 mV is measured due to a sensor drift, a correction value having any value between 0 mV and 50 mV can be subtracted from the amount of the actual sensor signal. In that case, it would be feasible, for example, that a correction value in the amount of 49 mV is subtracted from the amount of the measured actual sensor signal in the amount of ±50 mV.

Accordingly, a new difference value of 1 mV would result, which is used a new starting point, or "zero point", for subsequent measurements.

It is also feasible that the correction value is within a range of the amount of the actual sensor signal plus a tolerance value of ±10% of the actual sensor signal or plus a tolerance value of ±20% of the actual sensor signal. Accordingly, for example, with an actual sensor signal value of ±50 mV, a correction value $x_1$ within the range of 50 mV±10%, i.e., 45 mV<$x_1$<55 mV, or a correction value $x_2$ within the range of 50 mV±20%, i.e., 40 mV<$x_2$<60 mV might be selected.

The control means 302 is configured to perform calibration of the free-jet dosing system 100 prior to any or even to each pump stroke. Accordingly, the control means 302 can perform calibration prior to a suction stroke and/or prior to a pressure stroke of the micropump 101 as described above.

The dosage monitoring device 106 may thus be re-calibrated prior to each suction and/or pressure stroke of the pump 101. A possible sensor drift of the dosage monitoring device 106 is thus counteracted. Therefore, even a low-cost sensor, which is not mounted by means of expensive assembly processes and was possibly even housed under mechanical stress, may be used as an accurate dosage monitoring device 106 suitable for the inventive free-jet dosing system 100, 300. This applies both to a dosage monitoring device 106 arranged on the outlet side and to a flow sensor 110 arranged on the inlet side.

Prior to calibration of the free-jet dosing system 100 it should be ensured, however, that no free flow or merely a negligibly small flow of the fluid 104, 105, 109 takes place between inlet 102 and outlet 103 in order to be able to sufficiently compensate the drifting sensor signal. This can be ensured, among others, in that the free-jet dosing system 100 has, according to the invention, a lower pressure on the inlet side than on the outlet side. For example, a reservoir 201 described above with reference to FIG. 2A in more detail can be provided, wherein the fluid level in the reservoir 201 is to be kept below a fluid level at the outlet at all times. In this consideration, it is not relevant whether the connecting liquid-filled fluid channels are above or below the fluid level at the inlet 102 or the fluid level at the outlet 103. In that way, the hydrostatic pressure in the reservoir 201 is not sufficient to allow free fluid flow between inlet 102 and outlet 103. In this constellation, with regard to the pressure ratios, a reverse flow from the outlet 103 back to the inlet 102 would basically be possible, but the passive check valves 210, 211; 310, 311 of the pump 101 (see FIGS. 2A and 2B) are reverse-biased and prevent backflow, such that it is ensured that no flow (or only a negligible leakage flow) flows.

In order to ensure that no fluid flows through the pump 101, even in the switched off state of the pump 101, the following has to be considered. On the one hand, "free flow" is prevented from occurring by ensuring that no inlet pressure occurs. This can be realized in that the reservoir 201 including the fluid is arranged below the pump 101 as shown in FIG. 2A. Further, no overpressure should be applied to the reservoir 201 when the pump 101 is in the switched-off state.

Additionally, no flow should occur through closed valves 310, 311. If the pressure on the outlet side is higher than the pressure on the inlet side, these valves 310, 311 close. If the pressure on the inlet side is higher than the pressure on the outlet side, these valves 310, 311 open and the so-called free flow can occur. For preventing this, additional valves 140a, 140b can be provided. This may be implemented, for example, by configuring the valves 140a, 140b as one of the following valves:
Active valves
NO valve, which is closed
NC valve
Passive valves
Safety valve
DNC Valve
Microvalve with operation threshold pressure If, therefore, the free-jet dosing system 100, 300 has a higher pressure on the inlet side than on the outlet side, constructional measures could be taken for preventing free fluid flow between inlet 102 and outlet 103. According to the embodiment shown in FIG. 1B, an additional valve 140a, 140b can be provided. The valve 140a can be arranged on the outlet side. The valve 140b can alternatively be arranged on the inlet side. Also, one valve 140a, 140b each can be provided on the outlet side and on the inlet side.

The valve 140a, 140 can be closed, such that fee fluid flow between the inlet 102 and the outlet 103 can be prevented. The valve 140a, 140 can be an active normally closed valve as known, for example, from EP 1 320 686 B1. The valve 140a, 140b can be a valve with operating threshold pressure which is tight below a threshold pressure as known, for example, from DE 10 2008 035 990 A1. The valve 140a, 140b can be a so-called double normally closed microvalve, such as known from EP 1 576 296 B1. The valve 140a, 140b can also be a so-called safety valve as known from EP 2 220 371 B1.

As shown in FIG. 1B, the valve 140b provided on the inlet side can be arranged between the pump 101 and the flow sensor 106b arranged on the inlet side. The valve 140b provided on the inlet side can alternatively and advantageously also be arranged before the flow sensor 106b arranged on the inlet side in flow direction. This is advantageous since thereby the dead volumes, the fluidic capacitances and the fluidic inductances between flow sensor 110 and pump 101 are not enlarged. The valve 140a provided on the outlet side can be arranged, as illustrated in FIG. 1B, between the pump 101 and the dosage monitoring device 106 arranged on the outlet side. The valve 140a provided on the outlet side can alternatively also be arranged advantageously in the flow direction downstream from the dosage monitoring device 106 arranged on the outlet side.

As an alternative or in addition to the valves 140a, 140b, the pump 101 may comprise active inlet and outlet valves 210, 211; 310, 311 for preventing backflow of the fluid, i.e., from the outlet 103 to the inlet 102 by closing the active valves 210, 211; 310, 311.

Such a micropump having an active inlet valve and an active outlet valve is known, for example, from DE 102 38 600 A1.

With the aid of such a micropump having active valves, apart from backflow of the fluid, forward flow of the fluid (free flow) can also be prevented, when one of the active valves 210, 211; 310, 311 or both valves are actively closed.

In addition, according to embodiments of the invention, advantageously, no "fluidic capacitances" (e.g. soft plastic tubes or other elastic elements) that cause time delays until the flow comes to a standstill are supposed to exist between the pump 101 and the dosage monitoring device 106. This means, advantageously, that no long, soft lines exist between the pump 101 and the dosage monitoring device 106.

An advantageous arrangement would be, for example, a micropump 101 with a safety valve where the dosage monitoring device 106 is arranged immediately after the micropump 101, e.g. by adhering, clamping (via a seal), soldering the dosage monitoring device 106 and/or the flow sensor 110 directly onto the bottom of the pump 101 at the outlet 103 and/or inlet 102.

The control means 302 is configured, according to an embodiment, to compare the flow rate determined by means of the opening 107 of the dosage monitoring device 106 to a predefined flow rate comparison value and to control the pump 101 for such time until the flow rate determined by means of the opening 107 of the dosage monitoring device 106 is equal to or larger than the predefined flow rate comparison value.

In that way, the amount of fluid to be dispensed can be exactly dosed with the inventive free-jet dosing apparatus 100, 300. When, for example, a dispense amount of a fluid of 1.0 nl is desired, and the pump 101 can deliver a maximum of 0.25 nl per pump stroke, the control device 302 controls the pump 101 until the desired dispense amount of 1.0 nl is reached. In an intermittingly operating pump 101, this would be four pump strokes all in all.

The above-described dosage monitoring device 106 may consist of a ceramic but is advantageously configured as a semiconductor chip consisting of silicon, for example. A membrane 240, 502 (FIG. 2A and/or FIGS. 5A to 5E) is formed in the chip 106, e.g., by means of conventional etching processes. For example, four resistors 108, in particular piezoresistive resistors, are arranged in a Wheatstone bridge circuit on the membrane 240, 502; in the sectional views shown in the figures, only two resistors 108 can be seen in each case. The Wheatstone bridge circuit serves as a flow rate measuring means 108. The opening 107 provided within the dosage monitoring device 106 is advantageously configured within the membrane 240 and serves as a flow resistor having a defined forward resistance. The opening 107 may be introduced into the membrane 240 by means of dry etching, for example.

The dosing monitoring device 106 is configured to determine, by means of the flow rate measuring means 108, the amount of fluid flowing through the opening 107 on the basis of a transient, i.e., time-dependent, pressure signal. In this context, the dosage monitoring device 106 measures the pressure difference between that side of the membrane 240 which faces the pump inlet 102 and/or the pump outlet 103 and that side of the membrane 240 which faces away from the pump inlet 102 and/or the pump outlet 103.

The pressure difference changes over time. For example, with a dosage monitoring device 106 arranged on the outlet side, a high initial pressure is applied, at the beginning of a pump stroke, on that side of the membrane 240 which faces the pump outlet 103, said initial pressure being higher than the pressure applied on that side of the membrane 240 which faces away from the pump outlet 103. The rising edge of the pressure profile on that side of the membrane 240 which faces the pump outlet 103 thus rises steeply at the beginning of the pump stroke.

The closer the pump stroke comes to its end, the more fluid has already flowed through the opening 107 formed in the membrane 240. Accordingly, the over-pressure consisting on that side of the membrane 240 which faces the pump outlet 103 as compared to that side of the membrane 240 that faces away from the pump outlet 103 keeps decreasing. The pressure profile, or the pressure signal, thus has an edge which falls over time.

The dosage monitoring device 106 is configured such that the time-dependent flow of fluid through the nozzle 107 may be determined from the measured time-dependent pressure signal and the static characteristic of the opening, or nozzle, 107. This fluid flow may also be integrated over time in order to determine the dosed volume or the flow rate.

Thus, the dosage monitoring device 106 determines, on the basis of the pressure and by means of the flow rate measuring means 108, the flow rate of the fluid to be dispensed which flows through the nozzle 107 of the dosage monitoring device 106.

A major advantage of the inventive free-jet dosing system 100, 300 is the fact that measurement of the flow is very fast, i.e., flow variations of less than 1 ms may be dissolved.

To provide an overview, some of the above-described advantages of the inventive free-jet dosing system 100, 300 will be listed once again below:

The dosage monitoring means 106 and the flow sensor 110 monitor each other

Prior to the suction stroke: the dosage monitoring device 106 and the flow sensor 110 are "set to zero"

Suction stroke:
  filling of the pump chamber 202 through the inlet-side valve 211, 311 is measured with the flow sensor 110 arranged on the inlet side
  at the same time, the dosage monitoring device 106 arranged on the outlet side measures possible leakage rates of the outlet-side valve 210, 310 by means of the flow rate measuring device 108
  by integrating the signal of the dosage monitoring device 106 and the flow sensor signal of the flow sensor 110, the stroke volume may be accurately determined.

After the suction stroke: the dosage monitoring device 106 and the flow sensor 110 are set to zero again Pressure stroke:
  discharging the stroke volume through the outlet-side valve 210, 310 is measured by the dosage monitoring device 106 arranged on the outlet side
  at the same time, the flow sensor 110 arranged on the inlet side measures possible leakage rates of the inlet-side valve 211, 311 by means of the flow rate measuring means 112
  by integrating the signals of the dosage monitoring device 106 and of the flow sensor 110 the stroke volume can again be determined exactly possible volume stroke differences for suction stroke measurement still show the measurement error After the pressure stroke: the dosage monitoring device 106 and the flow sensor 110 are set to zero again Advantageously, not only the pump rate can thus be measured, but the function of the pump drive and of both valves 210, 211; 310, 311 including leaking rates can be permanently monitored.

A further advantage of the inventive free-jet dosing system 100, 300 is the option of detecting a nozzle blockage, i.e. a blockage of the respective nozzle 107 of the dosage monitoring device 106 arranged on the outlet side. It is also possible, however, to detect a blockage of the opening 111 of the flow sensor 110 arranged on the inlet side. Such a detection of a blockage can be performed by means of transient signal analysis.

With a static flow, the dosage monitoring device 106 and/or the flow sensor 110 (or the control device 302 connected to the dosage monitoring device 106 and the flow sensor 110) cannot differentiate whether the respective opening 107, 111 is blocked. However, the transient, time-dependent signal at the opening 107 of the dosage monitoring device 106 and/or at the opening 111 of the flow sensor 110 differs as a function of whether or not the opening 107, 111 is blocked.

If the opening 107, 111 is not blocked, the pressure pulse generated by the pump 101 will be reduced again within a few milliseconds. If the opening 107, 111 is blocked, an overpressure will build up that cannot flow off. This can be detected by a signal analysis of the dosage monitoring device 106 and/or of the flow sensor 110.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be executed by (or using) a hardware apparatus, like, for example, a time-resolved sample & hold data acquisition, a microprocessor, a programmable computer or an electronic circuit. In some embodiments, some or several of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which are capable of cooperating or cooperate with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Time-resolved data acquisition of the flow sensors, data processing, control of the micropump, generation of the high voltage used for the micropump that is, e.g. piezo- or electrostatically driven, and the control and regulation algorithms can be mounted, for example, on an ASIC (application specific integrated circuit), whereby the entire micro-dosing system micropump, flow sensors, control and ASIC can be realized in a very small installation space (e.g. 10×10×2 mm$^3$).

Other embodiments comprise the computer program for performing one of the methods described herein, wherein the computer program is stored on a machine readable carrier. In other words, an embodiment of the inventive method is, therefore, a computer program comprising a program code for performing one of the methods described herein, when the computer program runs on a computer.

A further embodiment of the inventive method is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transmit a computer program for performing one of the methods described herein to a receiver. The transmission can be performed electronically or optically. The receiver may, for example, be a computer, a mobile device, a memory device or the like. The apparatus or system may, for example, comprise a file server for transferring the computer program to the receiver.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are advantageously performed by any hardware apparatus. This can be a universally applicable hardware, such as a computer processor (CPU) or hardware specific for the method, such as ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A free-jet dosing system for dosing a free fluid jet to be dispensed, comprising:

a pump comprising an inlet and an outlet and configured to deliver fluid to be dispensed to the outlet, a dosage monitoring device arranged on an outlet side of the pump, the dosage monitoring device comprising an opening through which at least some of the fluid to be dispensed may pass, and the dosage monitoring device comprising a flow rate meter configured to determine the flow rate of the fluid which passes through the opening of the dosage monitoring device, the opening of the dosage monitoring device being configured as an outlet nozzle for ejecting the free fluid jet and for generating a defined jet breakage, wherein the outlet nozzle comprises a laterally surrounding collar, wherein the outlet nozzle is configured within a membrane of the dosage monitoring device, wherein the laterally surrounding collar is formed in that part of the membrane which comprises a recess being etched laterally around the outlet nozzle.

2. The free-jet dosing system as claimed in claim 1, wherein the dosage monitoring device is configured as a semiconductor chip comprised of silicon, and wherein the membrane is configured as a membrane formed within the semiconductor chip.

3. The free-jet dosing system as claimed in claim 1, wherein the outlet nozzle of the dosage monitoring device is configured as a conical nozzle.

4. The free-jet dosing system as claimed in claim 1, wherein the outlet nozzle of the dosage monitoring device comprises, at least in sections, a hydrophobic coating, said hydrophobic coating being mounted, at least in sections, within the outlet nozzle.

5. The free-jet dosing system as claimed in claim 1, wherein the dosage monitoring device is arranged directly at the outlet of the pump, no elastic elements or seals or tubes, being located between an outlet valve, provided at the outlet, and the outlet nozzle.

6. The free-jet dosing system as claimed in claim 1, wherein the pump comprises, on the outlet side, a check valve configured to close the outlet when the pump sucks in the fluid to be dispensed, and to open the outlet when the pump dispenses the fluid to be dispensed from the outlet.

7. The free-jet dosing system as claimed in claim 1, the free-jet dosing system comprising a nozzle chamber arranged between the outlet of the pump and the outlet nozzle, and a check valve being arranged between the pump outlet and the nozzle chamber.

8. The free-jet dosing system as claimed in claim 1, wherein the pump comprises a pump chamber, the free-jet dosing system comprising a nozzle chamber arranged between the outlet of the pump and the outlet nozzle, as well as a controller configured to control the flow rate meter and the pump such that the flow rate meter detects a flow of fluid from the nozzle chamber to the pump chamber when the pump sucks in the fluid to be dispensed.

9. The free-jet dosing system as claimed in claim 1, wherein the pump comprises, on the inlet side, a check valve configured to close the inlet when the pump dispenses the fluid to be dispensed, and to open the inlet when the pump sucks in the fluid to be dispensed.

10. The free-jet dosing system as claimed in claim 1, the free-jet dosing system comprising a controller configured to determine a time-variable value of a fluid pressure applied to the outlet nozzle of the dosage monitoring device arranged on the outlet side, and to determine the time-dependent flow of fluid through the outlet nozzle by means of the time-variable fluid pressure applied to the outlet nozzle and of the static characteristic of the outlet nozzle, and to integrate the fluid flow thus determined over time so as to determine the volume of the free fluid jet to be dosed.

11. The free-jet dosing system as claimed in claim 1, the free-jet dosing system comprising a controller configured to compare an amount of a free fluid jet dispensed, said amount having been determined by means of the flow rate meter, to an amount comparison value, and to generate a signal if the amount dispensed is smaller than the amount comparison value.

12. The free-jet dosing system as claimed in claim 1, wherein a controller is configured to determine, when a free fluid jet is dispensed, a value of the amplitude of the fluid pressure applied to the outlet nozzle of the dosage monitoring device and to compare same to an amplitude comparison value and/or to measure the period of time taken for pressure equalization at the outlet nozzle and to compare same to a time comparison value so as to detect a gas bubble within the pump chamber of the pump if the determined amplitude value is smaller than the amplitude comparison value and/or if the measured time period for pressure equalization is larger than the time comparison value.

13. The free-jet dosing system as claimed in claim 1, the free-jet dosing system comprising a nozzle chamber arranged between the pump outlet and the outlet nozzle, and a controller being configured to determine, when a free fluid jet is dispensed, a value of the amplitude of the fluid pressure applied to the outlet nozzle of the dosage monitoring device and to compare same to an amplitude comparison value and/or to measure the period of time taken for a pressure increase at the outlet nozzle and to compare same to a time comparison value so as to thus detect a gas bubble within the nozzle chamber if the determined amplitude value is smaller than the amplitude comparison value and/or if the measured time period for the pressure increase is larger than the time comparison value.

14. The free-jet dosing system as claimed in claim 1, the free-jet dosing system comprising a valve arranged on the inlet side and/or the outlet side, said valve being an active normally closed valve and/or an active normally open valve and/or a valve with an operation threshold pressure which is closed below a threshold pressure, and/or a double normally closed microvalve and/or a safety valve.

15. The free-jet dosing system as claimed in claim 1, the free-jet dosing system comprising a flow sensor comprising an opening and a flow rate meter, the flow rate meter being configured to determine the flow rate of the fluid passing through this opening, the flow sensor being arranged on the inlet side, at the inlet of the pump, and the dosage monitoring device being arranged on the outlet side, at the outlet of the pump.

16. The free-jet dosing system as claimed in claim 15, the free-jet dosing system comprising a controller configured to control the pump as well as the dosage monitoring device and the flow sensor arranged on the inlet side such that both the dosage monitoring device and the flow sensor determine the flow rate of the fluid flowing through the respective opening of the dosage monitoring device and of the flow sensor when the pump sucks in the fluid to be dispensed, and wherein the controller is further configured to compare the flow rate determined by the dosage monitoring device and the flow rate determined by the flow sensor.

17. The free-jet dosing system as claimed in claim 15, the free-jet dosing system comprising a controller configured to control the pump as well as the dosage monitoring device and the flow sensor, which is arranged on the inlet side, such that the dosage monitoring device and the flow sensor determine the flow rate of the fluid flowing through the respective opening of the dosage monitoring device and of the flow sensor when the pump dispenses the fluid to be dispensed from the outlet, and the controller further being configured to compare the flow rate determined by the dosage monitoring device and the flow rate determined by the flow sensor.

18. The free-jet dosing system as claimed in claim 1, wherein the pump is a micropump.

19. The free-jet dosing system as claimed in claim 1, wherein the pump comprises a pump chamber arranged between the inlet and the outlet, an additional membrane arranged, at least in sections, in the region of the pump chamber, and a membrane deflector, said membrane deflector being configured to deflect the additional membrane such that the volume of the pump chamber is increased for sucking in the fluid to be dispensed, and that the volume of the pump chamber is reduced for dispensing the fluid to be dispensed.

20. The free-jet dosing system as claimed in claim 19, wherein the membrane deflector is a piezoelement configured to deflect the membrane in dependence on the voltage applied to the piezoelement.

21. The free-jet dosing system as claimed in claim 1, wherein the flow rate meter is configured as a Wheatstone measuring bridge comprising piezoresistive resistors.

* * * * *